(12) United States Patent
Hwang

(10) Patent No.: US 12,456,042 B2
(45) Date of Patent: Oct. 28, 2025

(54) NEUROMORPHIC COMPUTING DEVICE AND METHOD OF OPERATING THE SAME

(71) Applicant: SAMSUNG ELECTRONICS CO., LTD., Suwon-si (KR)

(72) Inventor: Youngnam Hwang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 802 days.

(21) Appl. No.: 17/717,339

(22) Filed: Apr. 11, 2022

(65) Prior Publication Data

US 2023/0038384 A1 Feb. 9, 2023

(30) Foreign Application Priority Data

Aug. 9, 2021 (KR) .................. 10-2021-0104555

(51) Int. Cl.
*G06N 3/063* (2023.01)
*G11C 13/00* (2006.01)

(52) U.S. Cl.
CPC ......... *G06N 3/063* (2013.01); *G11C 13/0026* (2013.01); *G11C 13/0028* (2013.01); *G11C 13/004* (2013.01)

(58) Field of Classification Search
CPC .... G06N 3/063; G06N 3/065; G11C 13/0026; G11C 13/0028; G11C 13/004; G11C 2013/0054; G11C 11/54; G06F 30/30
USPC .......................................................... 716/100
See application file for complete search history.

(56) References Cited

U.S. PATENT DOCUMENTS

| 6,445,612 | B1 | 9/2002 | Naji |
| 10,340,003 | B1 | 7/2019 | Chang et al. |
| 10,453,532 | B1 | 10/2019 | Antonyan |
| 10,474,948 | B2 | 11/2019 | Yakopcic et al. |
| 10,476,487 | B2 | 11/2019 | Roy et al. |
| 10,790,016 | B2 | 9/2020 | Choi et al. |

(Continued)

FOREIGN PATENT DOCUMENTS

| KR | 10-2019-0129384 A | 11/2019 |
| KR | 10-2021-0000987 A | 1/2021 |

OTHER PUBLICATIONS

Communication dated Aug. 29, 2025, issued by the Korean Patent Office in Korean Application No. 10-2021-0104555.

*Primary Examiner* — Paul Dinh
(74) *Attorney, Agent, or Firm* — Sughrue Mion, PLLC

(57) ABSTRACT

A neuromorphic computing device a method of controlling thereof are provided. The neuromorphic computing device includes a first memory cell array including resistive memory cells that are connected to wordlines, bitlines and source lines, and configured to store data and generate read currents based on input signals and the data; a second memory cell array including reference resistive memory cells that are connected to reference wordlines, reference bitlines and reference source lines, and configured to generate reference currents; and an analog-to-digital converting circuit configured to convert the read currents into digital signals based on the reference currents, wherein a voltage is applied to the reference wordlines, the reference resistive memory cells are arranged in columns to form reference columns, and the reference columns are configured to generate column currents, and one of the reference currents is generated by averaging at least two of the column currents.

20 Claims, 35 Drawing Sheets

(56) References Cited

U.S. PATENT DOCUMENTS

| | | | |
|---|---|---|---|
| 10,832,773 | B1 | 11/2020 | Kim et al. |
| 10,878,317 | B2 | 12/2020 | Hatcher et al. |
| 10,891,222 | B2 | 1/2021 | Wei |
| 11,302,392 | B2 | 4/2022 | Hwang |
| 11,379,714 | B2 | 7/2022 | Peng et al. |
| 11,604,974 | B2 | 3/2023 | Kouno et al. |
| 2016/0284400 | A1 | 9/2016 | Yakopcic et al. |
| 2018/0277209 | A1* | 9/2018 | Lam .................. G11C 13/004 |
| 2019/0370640 | A1 | 12/2019 | Peng et al. |
| 2020/0151550 | A1 | 5/2020 | Garbin et al. |
| 2020/0202204 | A1 | 6/2020 | Kouno et al. |
| 2020/0218963 | A1 | 7/2020 | Yasuda et al. |

\* cited by examiner

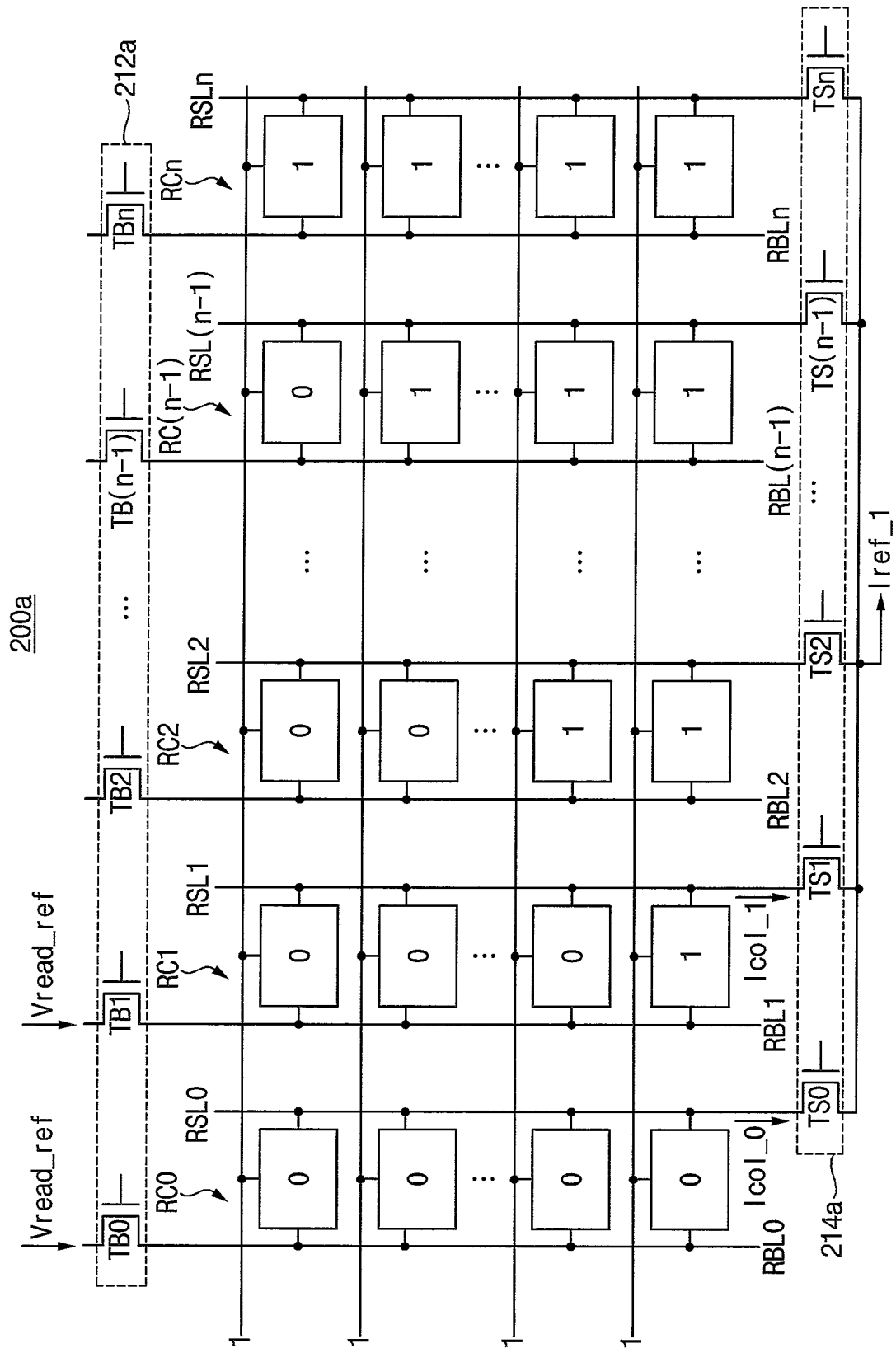

FIG. 8

| INPUT (x) | WEIGHT (W) | OUTPUT (x*W) | CELL CURRENT |
|---|---|---|---|
| 0 | 0 | 0 | Ioff(Rhigh) |
| 0 | 1 | 0 | Ioff(Rlow) |
| 1 | 0 | 0 | Ion(Rhigh) |
| 1 | 1 | 1 | Ion(Rlow) |

NEUROMORPHIC COMPUTING DEVICE AND METHOD OF OPERATING THE SAME

CROSS-REFERENCE TO RELATED APPLICATION

This application claims priority under 35 U.S.C. § 119 to Korean Patent Application No. 10-2021-0104555 filed on Aug. 9, 2021 in the Korean Intellectual Property Office (KIPO), the disclosure of which are incorporated by reference herein in its entirety.

BACKGROUND

1. Field

Example embodiments relate generally to semiconductor integrated circuits, and more particularly to neuromorphic computing devices including resistive memory cells, and methods of operating the neuromorphic computing devices.

2. Description of the Related Art

Some applications involving Deep-Learning Neural Networks (NNs) or neuromorphic computing such as image recognition, natural language processing and more generally various pattern-matching or classification tasks are becoming more important. The computational element of an example NN (also referred to as "neuron") multiplies of a set of input signals by a set of weights and sums the products thereof. Thus, the neuron performs a vector-matrix product, or multiply-accumulate (MAC) operation. ANN may include a large number of interconnected neurons, each of which performs a MAC operation. Thus, operation of a NN may be computationally intensive.

A neuromorphic computing device or a neuromorphic chip is a semiconductor circuit that is manufactured by simulating, replicating or copying information processing methods using an artificial neural system at the neuron level. The neuromorphic computing devices may be used to implement intelligent systems that may adapt themselves to dynamic and/or uncertain environments.

SUMMARY

One or more example embodiments of the present disclosure provides a neuromorphic computing device capable of preventing the decrease in the accuracy of inference due to temperature and/or time dependency of resistive memory cells.

One or more example embodiments of the present disclosure provides a method of operating the neuromorphic computing device.

According to an embodiment, there is provided a neuromorphic computing device including: a first memory cell array including a plurality of resistive memory cells that are connected to a plurality of wordlines, a plurality of bitlines and a plurality of source lines, and configured to store data and generate a plurality of read currents based on a plurality of input signals and the data; a second memory cell array including a plurality of reference resistive memory cells that are connected to a plurality of reference wordlines, a plurality of reference bitlines and a plurality of reference source lines, and configured to generate a plurality of reference currents; and an analog-to-digital converting circuit configured to convert the plurality of read currents into a plurality of digital signals based on the plurality of reference currents, wherein the plurality of reference resistive memory cells are arranged in columns to form a plurality of reference columns, and the plurality of reference columns are configured to generate a plurality of column currents, and one of the plurality of reference currents is generated by averaging at least two of the plurality of column currents.

According to an embodiment, there is provided a method of operating a neuromorphic computing device including a first memory cell array, a second memory cell array and an analog-to-digital converting circuit. The method includes: generating, by the first memory cell array, a plurality of read currents based on a plurality of input signals and data stored in the first memory cell array; generating, by the second memory cell array, a plurality of reference currents; and converting, by the analog-to-digital converting circuit, the plurality of read currents into a plurality of digital signals based on the plurality of reference currents, wherein the first memory cell array includes a plurality of resistive memory cells that are connected to a plurality of wordlines, a plurality of bitlines and a plurality of source lines, and is configured to store the data, the second memory cell array includes a plurality of reference resistive memory cells that are connected to a plurality of reference wordlines, a plurality of reference bitlines and a plurality of reference source lines, the plurality of reference resistive memory cells are arranged in columns to form a plurality of reference columns and the plurality of reference columns are configured to generate a plurality of column currents, and one of the plurality of reference currents is generated by averaging at least two of the plurality of column currents.

According to an embodiment, there is provided a neuromorphic computing device including: a first memory cell array including a plurality of resistive memory cells that are connected to a first worldline to an n-th wordline, a first bitline to an m-th bitline and a first source line to an m-th source line, where each of n and m is a natural number greater than or equal to two; a second memory cell array including a plurality of reference resistive memory cells that are connected to a plurality of reference wordlines, a plurality of reference bitlines and a plurality of reference source lines; a wordline driver configured to drive the first wordline to the n-th wordline and the plurality of reference wordlines, enable at least one wordline among the first wordline to the n-th wordline based on element values of an input feature vector, and enable the plurality of reference wordlines; an analog-to-digital converting circuit configured to convert a first read current to an m-th read current into a first digital signal to an m-th digital signal, respectively, based on the first reference current to the n-th reference current, the first read current to the m-th read current being output from the first memory cell array through the first bitline to the m-th bitline or the first source line to the m-th source line, the first reference current to the n-th reference current being output from the second memory cell array through the plurality of reference source lines; and an adder circuit configured to generate output data by performing accumulation and summation operations based on the first digital signal to the m-th digital signal, wherein each of the first read current to the m-th read current has a first current level to an (n+1)-th current level, respectively, a current level of an i-th reference current among the first reference current to the n-th reference current is between an i-th current level and an (i+1)-th current level among the first current level to the (n+1)-th current level, where i is a natural number greater than or equal to one and less than or equal to n, the plurality of reference resistive cells are arranged in columns to form a plurality of reference columns, and the plurality of reference columns are configured to generate a plurality of column currents, and the i-th reference current is generated by averaging a column current having the i-th current level and a column current having the (i+1)-th current level among the plurality of column currents. According to an embodiment, there is provided a neuromorphic computing device including: a first memory cell array including a plurality of resistive memory cells that are connected to a plurality of wordlines, a plurality of bitlines and a plurality of source lines, and configured to store data and generate a plurality of read currents based on a plurality of input signals and the data; a second memory cell array including a plurality of reference resistive memory cells that are connected to a plurality of reference wordlines, a plurality of reference bitlines and a plurality of reference source lines, and configured to generate a plurality of reference currents; and an analog-to-digital converting circuit configured to convert the plurality of read currents into a plurality of digital signals based on the plurality of reference currents, wherein a voltage is applied to the plurality of reference wordlines, the plurality of reference resistive memory cells arranged in columns form a plurality of reference columns, and the plurality of reference columns are configured to generate a plurality of column currents, and one of the plurality of reference currents is generated by averaging at least two of the plurality of column currents.

BRIEF DESCRIPTION OF THE DRAWINGS

One or more non-limiting example embodiments will be more clearly understood from the following detailed description taken in conjunction with the accompanying drawings.

FIGS. 6A, 6B and 6C are diagrams for describing an operation of a second memory cell array of FIG. 5.

FIGS. 8, 9 and 10 are diagrams for describing characteristics of a neuromorphic computing device according to example embodiments.

DETAILED DESCRIPTION

Figure 1:
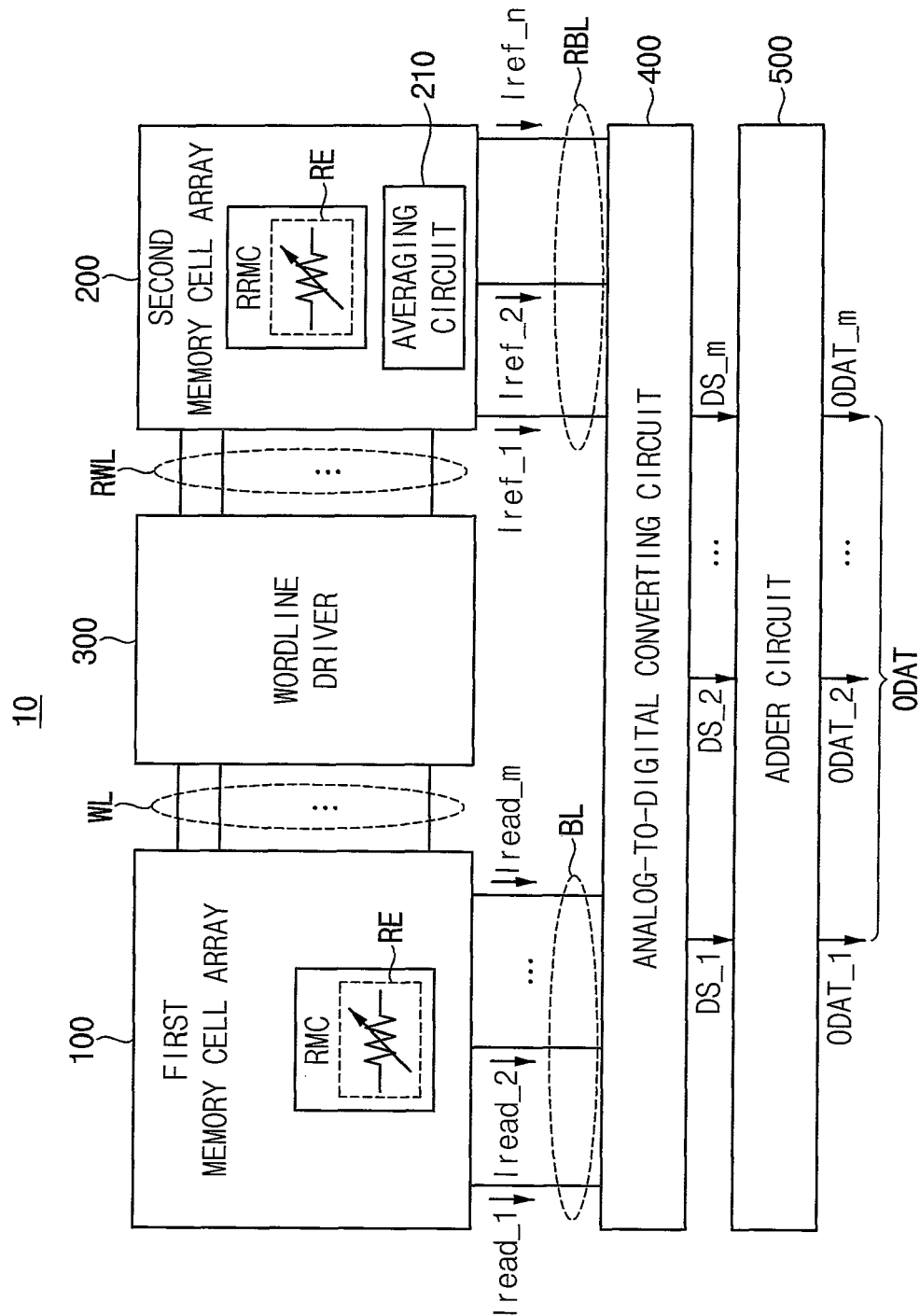
FIG. 1 is a block diagram illustrating a neuromorphic computing device according to an example embodiment.

Various example embodiments will be described more fully with reference to the accompanying drawings. The present disclosure may, however, be embodied in many different forms and should not be construed as being limited to the embodiments set forth herein. Like reference numerals refer to like elements throughout the disclosure.

FIG. 1 is a block diagram illustrating a neuromorphic computing device according to an example embodiment.

Referring to FIG. 1, a neuromorphic computing device 10 includes a first memory cell array 100, a second memory cell array 200, a wordline driver 300, an analog-to-digital converting circuit 400 and an adder circuit 500. The neuromorphic computing device 10 may be referred to as a multiplier-and-accumulator (MAC), and each of the first memory cell array 100 and the second memory cell array 200 may be referred to as a crossbar array.

The first memory cell array 100 includes a plurality of resistive memory cells RMC that are arranged in a matrix formation. Each of the plurality of resistive memory cells RMC may include a resistive element RE. For example, each of the plurality of resistive memory cells RMC may be disposed or located in a region in which a respective one of a plurality of wordlines WL and a respective one of a plurality of bitlines BL intersect. For example, each of the plurality of resistive memory cells RMC may be connected to a respective one of the plurality of wordlines WL and a respective one of the plurality of bitlines BL. For example, the number of the plurality of wordlines WL may be n, and the number of the plurality of bitlines BL may be m, where each of n and m is a natural number greater than or equal to two. The first memory cell array 100 may be also referred to as a main memory cell array. A detailed configuration of the first memory cell array 100 will be described with reference to FIGS. 3A and 3C.

The first memory cell array 100 stores a plurality of data. For example, the plurality of data may be stored in the plurality of resistive memory cells RMC using a change in a resistance of the resistive element RE included in each of the plurality of resistive memory cells RMC.

Under a control of the wordline driver 300, the first memory cell array 100 generates a plurality of read currents Iread_1, Iread_2, ..., Iread_m based on a plurality of input signals that are provided through the plurality of wordlines WL connected to the wordline driver 300 and the plurality of data that are internally stored, and outputs the plurality of read currents Iread_1 to Iread_m through electrical paths that include the plurality of bitlines BL. For example, the plurality of input signals may include a plurality of input voltages and/or a plurality of input currents that are provided through the plurality of wordlines WL. For example, the plurality of read currents Iread_1 to Iread_m may be output through the plurality of bitlines BL or a plurality of source lines (e.g., SL1, SL2, . . . , SLm in FIG. 3C), and may be provided to the analog-to-digital converting circuit 400.

In some example embodiments, as will be described with reference to FIGS. 2A and 2B, the neuromorphic computing device 10 may be used to drive at least one of various neural network systems and/or machine learning systems, e.g., an artificial neural network (ANN) system, a convolutional neural network (CNN) system, a deep neural network (DNN) system, a deep learning system, or the like. Such machine learning systems may include a variety of learning models, such as convolutional neural networks (CNN), deconvolutional neural networks, recurrent neural networks (RNN) including long short-term memory (LSTM) units and/or gated recurrent units (GRU), stacked neural networks (SNN), state-space dynamic neural networks (SSDNN), deep belief networks (DBN), generative adversarial networks (GANs), and/or restricted Boltzmann machines (RBM). Alternatively or additionally, such machine learning systems may include other forms of machine learning models, for example, linear and/or logistic regression, statistical clustering, Bayesian classification, decision trees, dimensionality reduction such as principal component analysis, and expert systems, and/or combinations thereof, including ensemble methods such as random forests. Such machine learning models may also be used to provide various services and/or applications, e.g., an image classify service, a user authentication service based on bio-information or biometric data, an advanced driver assistance system (ADAS) service, a voice assistant service, an automatic speech recognition (ASR) service, or the like, may be performed, executed or processed by the neuromorphic computing device 10.

According to an example embodiment, the plurality of data stored in the first memory cell array 100 may represent a plurality of weights (e.g., a plurality of elements of a weight matrix) included in at least one layer of a neural network system, and the plurality of read currents Iread_1 to Iread_m may represent a result of multiplication and accumulation operations performed by the neural network system. For example, the first memory cell array 100 may perform a data storage operation and a computational operation (or arithmetic operation or calculation operation) at once, which will be described with reference to FIG. 3B.

The second memory cell array 200 includes a plurality of reference resistive memory cells RRMC that are arranged in a matrix formation. As with the plurality of resistive memory cells RMC, each of the plurality of reference resistive memory cells RRMC may include a resistive element RE. For example, each of the plurality of reference resistive memory cells RRMC may be disposed in a region in which a respective one of a plurality of reference wordlines RWL and a respective one of a plurality of reference bitlines RBL (e.g., RBL0, RBL1, RBL2, . . . , RBL(n−1), RBLn in FIG. 5) intersect. For example, each of the plurality of reference resistive memory cells RRMC may be connected to a respective one of the plurality of reference wordlines RWL and a respective one of the plurality of reference bitlines RBL. For example, the number of the plurality of reference wordlines RWL may be greater than or equal to n, and the number of the plurality of reference bitlines RBL may be greater than n. The second memory cell array 200 may be referred to as a reference memory cell array. A detailed configuration of the second memory cell array 200 will be described with reference to FIGS. 5, 7, 11 and 13.

Under a control of the wordline driver 300, the second memory cell array 200 generates a plurality of reference currents Iref_1, Iref_2, . . . , Iref_n, and outputs the plurality of reference currents Iref_1 to Iref_n through electrical paths that include the plurality of reference bitlines RBL. For example, the plurality of reference currents Iref_1 to Iref_n may be output through a plurality of reference source lines (e.g., RSL0, RSL1, RSL2, . . . , RSL(n−1), RSLn in FIG. 5), and may be provided to the analog-to-digital converting circuit 400.

In addition, the second memory cell array 200 includes an averaging circuit 210 for generating the plurality of reference currents Iref_1 to Iref_n. For example, a plurality of reference columns (e.g., RC0, RC1, RC2, . . . , RC(n−1), RCn in FIG. 5) that generate a plurality of column currents (e.g., Icol_0, Icol_1, Icol_2, . . . , Icol_(n−1), Icol_n in FIGS. 6A, 6B and 6C) may be formed by the plurality of reference resistive memory cells RRMC, and the averaging circuit 210 may generate one of the plurality of reference currents Iref_1 to Iref_n by averaging at least two of the plurality of column currents. For example, voltages having (or under) a fixed condition may be applied to the plurality of reference wordlines RWL. In other words, a voltage of the same magnitude may be applied to all of the plurality of reference wordlines RWL.

In some example embodiments, the plurality of reference resistive memory cells RRMC in the second memory cell array 200 may include the same resistive material as a resistive material included in the plurality of resistive memory cells RMC in the first memory cell array 100. For example, the resistive element RE in each of the resistive memory cells RMC and the resistive element RE in each of the reference resistive memory cells RRMC may include or be formed of the same resistive material.

In some example embodiments, as will be described with reference to FIG. 3A, the plurality of resistive memory cells RMC and the plurality of reference resistive memory cells RRMC may include at least one of various resistive memory cells and at least one of various resistive materials. However, example embodiments are not limited thereto. For example, the plurality of resistive memory cells RMC and the plurality of reference resistive memory cells RRMC may include at least one of various elements that output currents while storing data, and/or at least one of various elements that output voltages while storing data. For example, in a case of the at least one of various elements that output voltages, the read currents Iread_1 to Iread_m and the reference currents Iref_1 to Iref_n in FIG. 1 may be replaced with read voltages and reference voltages, respectively.

In some example embodiments, the number of the plurality of reference currents Iref_1 to Iref_n that are generated from the second memory cell array 200 may be equal to the number of the plurality of wordlines WL that are connected to the first memory cell array 100. For example, the number of the plurality of reference currents Iref_1 to Iref_n may be n.

In some example embodiments, the number of the plurality of reference currents Iref_1 to Iref_n may be determined based on the number of bits of digital signals (e.g., DS_1, DS_2, . . . , DS_m) to be described later. For example, when the number of bits of each digital signal is k, where k is a natural number, the number of the reference currents Iref_1 to Iref_n may correspond to a number obtained by subtracting one from $2^k$. For example, when each digital signal is a 2-bit digital signal, a 4-bit digital signal and a 5-bit digital signal, the number of the plurality of reference currents Iref_1 to Iref_n may be three, fifteen and thirty one, respectively.

The wordline driver 300 may drive the plurality of wordlines WL connected to the first memory cell array 100, and may drive the plurality of reference wordlines RWL connected to the second memory cell array 200.

For example, during the computational operation of the neuromorphic computing device 10, the wordline driver 300 may drive the plurality of wordlines WL such that at least one wordline selected from among the plurality of wordlines WL is enabled or activated based on element values of an input feature vector. For example, when each of the element values of the input feature vector whose length is n has a value of '1' or '0', the wordline driver 300 may drive the plurality of wordlines WL such that a wordline corresponding to a position of an element having a value of '1' is enabled.

For example, during the computational operation of the neuromorphic computing device 10, the wordline driver 300 may drive the plurality of reference wordlines RWL such that all of the plurality of reference wordlines RWL are enabled or activated. For example, as described above, the wordline driver 300 may drive the plurality of reference wordlines RWL such that the voltages having a fixed condition may be applied to the plurality of reference wordlines RWL. In other words, a voltage of the same magnitude may be applied to all of the plurality of reference wordlines RWL.

The analog-to-digital converting circuit 400 converts the plurality of read currents Iread_1 to Iread_m into a plurality of digital signals DS_1, DS_2, . . . , DS_m based on the plurality of reference currents Iref_1 to Iref_n, and outputs the plurality of digital signals DS_1 to DS_m. For example, the analog-to-digital converting circuit 400 may convert the plurality of read currents Iread_1 to Iread_m into the plurality of digital signals DS_1 to DS_m using the plurality of reference currents Iref_1 to Iref_n as references for analog-to-digital conversion. For example, the analog-to-digital converting circuit 400 may include a plurality of analog-to-digital converters. In some example embodiments, the number of the analog-to-digital converters may be equal to the number of the read currents Iread_1 to Iread_m. In other example embodiments, the number of the analog-to-digital converters may be less than the number of the read currents Iread_1 to Iread_m. A detailed configuration of the analog-to-digital converting circuit 400 will be described with reference to FIGS. 19A and 19B. The analog-to-digital converting circuit 400 may provide the plurality of digital signals DS_1 to DS_m to the adder circuit 500.

In some example embodiments, each of the plurality of read currents Iread_1 to Iread_m may have one of a plurality of current levels depending on the number of the plurality of wordlines WL, and the plurality of reference currents Iref_1 to Iref_n may be used to determine a current level of each of the plurality of read currents Iread_1 to Iread_m.

The adder circuit 500 may generate output data ODAT by performing accumulation and summation operations based on the plurality of digital signals DS_1 to DS_m. For example, the adder circuit 500 may generate a plurality of output data ODAT_1, ODAT_2, . . . , ODAT_m based on the plurality of digital signals DS_1 to DS_m. For example, the adder circuit 500 may include at least one adder and at least one shift register.

Typically, the plurality of resistive memory cells RMC included in the first memory cell array 100 have a temperature dependency and a time dependency. For example, the resistive element RE included in each of the plurality of resistive memory cells RMC may have a temperature dependency in which a resistance decreases as a temperature increases and the resistance increases as the temperature decreases. In addition, the resistive element RE may have a time dependency including a retention characteristic in which the resistance decreases as time passes, a drift characteristic in which the resistance increases when a predetermined time elapses after a data write operation, or the like. Thus, the read currents Iread_1 to Iread_m output from the first memory cell array 100 may be changed depending on temperature and time. To store accurate data and perform computation or calculation without errors, it is important to reduce or eliminate such temperature and time dependency.

In the neuromorphic computing device 10 according to example embodiments, the plurality of read currents Iread_1 to Iread_m may be converted into the plurality of digital signals DS_1 to DS_m using the plurality of reference currents Iref_1 to Iref_n output from the second memory cell array 200 that includes the same resistive material as the resistive element RE in the first memory cell array 100. Thus, the second memory cell array 200 may have the same temperature and/or time dependency as those of the first memory cell array 100, and the decrease in the accuracy of inference of the neuromorphic computing device 10 due to the temperature and/or time dependency of the plurality of resistive memory cells RMC may be prevented. Accordingly, the accuracy and reliability of the computation or inference of the neuromorphic computing device 10 may be improved.

In addition, in the neuromorphic computing device 10 according to example embodiments, the second memory cell array 200 may generate the plurality of reference currents Iref_1 to Iref_n based on an averaging scheme. Ideally, a current level of one reference current may be formed at a center between current levels of two adjacent read currents, and thus an average value of the current levels of the two adjacent read currents may be calculated and obtained as the current level of the one reference current. Accordingly, the second memory cell array 200 may accurately and efficiently generate the plurality of reference currents Iref_1 to Iref_n without any offset resistor, and the neuromorphic computing device 10 may have improved or enhanced performance.

Figure 2A:
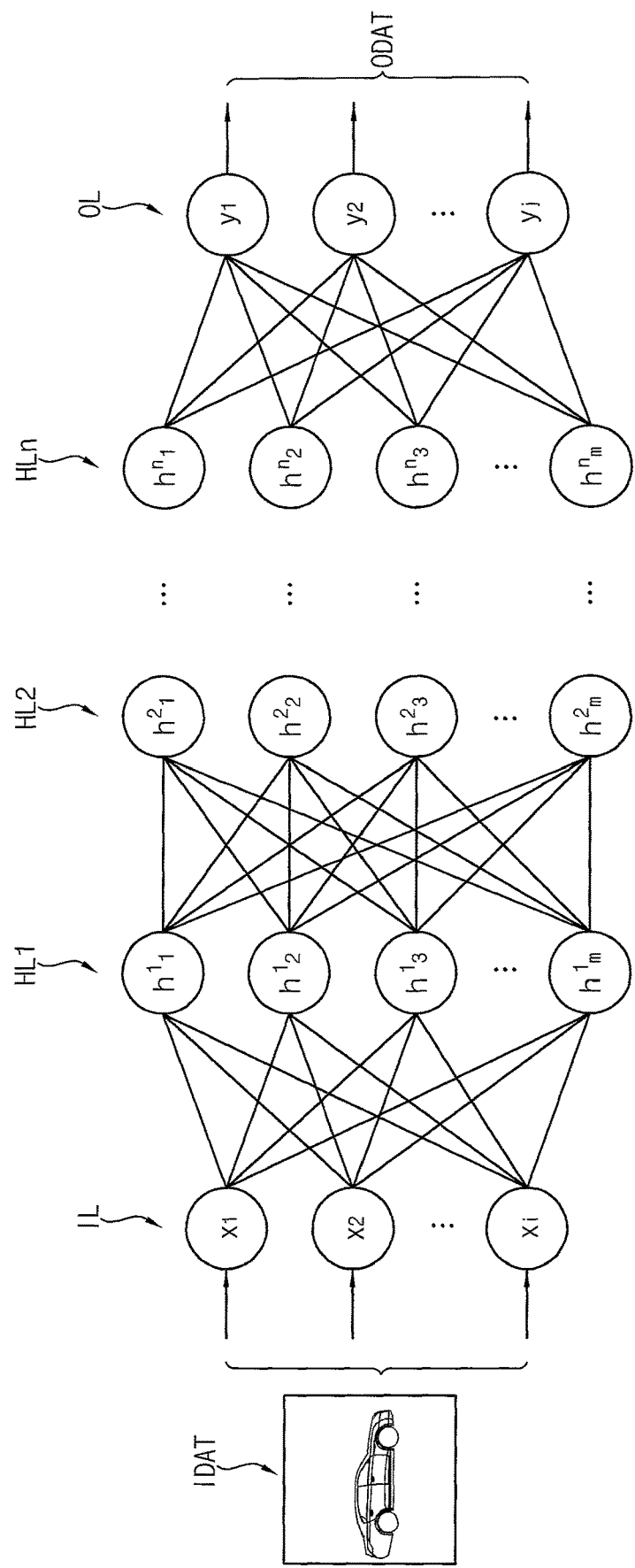
FIGS. 2A and 2B are diagrams for describing a neural network system that is driven by a neuromorphic computing device according to example embodiments.
Figure 2B:
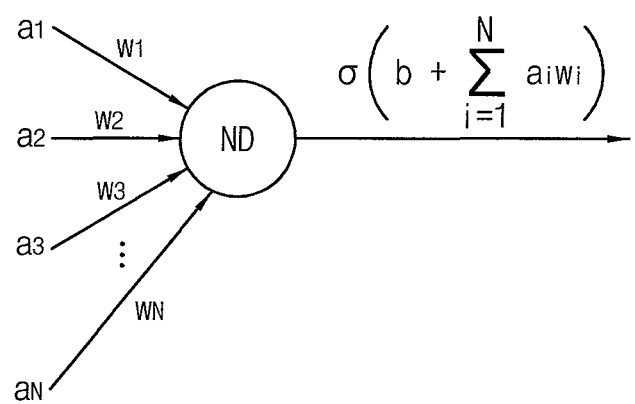

FIGS. 2A and 2B are diagrams for describing examples of a neural network system that is driven by a neuromorphic computing device according to example embodiments.

Referring to FIG. 2A, a general neural network may include an input layer IL, a plurality of hidden layers HL1, HL2, . . . , HLn and an output layer OL.

The input layer IL may include i input nodes $x_1$, $x_2$, . . . , $x_i$, where i is a natural number. Input data (e.g., vector input data) DAT having a length i may be input to the input nodes $x_1, x_2, \ldots, x_i$ such that each element of the input data DAT is input to respective input nodes $x_1, x_2, \ldots, x_i$.

The plurality of hidden layers HL1 to HLn may include n hidden layers, where n is a natural number, and may include a plurality of hidden nodes $h^1_1$, $h^1_2$, $h^1_3$, . . . , $h^1_m$, $h^2_1$, $h^2_2$, $h^2_3$, . . . , $h^2_m$, through $h^n_1$, $h^n_2$, $h^n_3$, . . . , $h^n_m$, where each of n and m is a natural number. For example, the hidden layer HL1 may include m hidden nodes $h^1_1$ to $h^1_m$, the hidden layer HL2 may include m hidden nodes $h^2_1$ to $h^2_m$, and the hidden layer HLn may include m hidden nodes $h^n_1$ to $h^n_m$.

The output layer OL may include j output nodes $y_1$, $y_2$, . . . , $y_j$, where j is a natural number. Each of the output nodes $y_1$ to $y_j$ may correspond to a respective one of classes to be categorized. The output layer OL may generate output values (e.g., class scores or numerical output such as a regression variable) and/or output data ODAT associated with the input data DAT for each of the classes. In some example embodiments, the output layer OL may be a fully-connected layer and may represent, for example, and may output a probability that the input data DAT corresponds to a car as the output data ODAT.

A structure of the neural network illustrated in FIG. 2A may be represented by information on branches (or connections) between nodes illustrated as lines, and a weighted value assigned to each branch. In some neural network models, nodes within one layer may not be connected to one another, but nodes of different layers may be fully or partially connected to one another. In some other neural network models, such as unrestricted Boltzmann machines, at least some nodes within one layer may also be connected to other nodes within one layer in addition to (or alternatively with) one or more nodes of other layers.

Each node (e.g., the node $h^1_1$) may receive an output of a previous node (e.g., the node $x_1$), may perform a computing operation, computation or calculation on the received output, and may output a result of the computing operation, computation or calculation as an output to a next node (e.g., the node $h^2_1$). Each node may calculate a value to be output by applying the input to a specific function, e.g., a nonlinear function.

In some example embodiments, the structure of the neural network is set in advance, and the weighted values for the connections between the nodes are set appropriately using sample data having sample answer (also referred to as "label"), which indicates a class the data corresponding to a sample input value. The data with the sample answer may be referred to as "training data", and a process of determining the weighted value may be referred to as "training". The neural network "learns" to associate the data with corresponding labels during the training process. A group of an independently trainable structure and the weighted value may be referred to as a "model", and a process of predicting, by the model with the determined weighted value, which class the input data belongs to, and then outputting the predicted value, may be referred to as a "testing" process.

Referring to FIG. 2B, an example of an operation performed by one node ND included in the neural network of FIG. 2A is illustrated in detail.

Based on N inputs $a_1, a_2, a_3, \ldots, a_N$ provided to the node ND, where N is a natural number greater than or equal to two, the node ND may multiply the N inputs $a_1$ to $a_N$ and corresponding N weights $w_1, w_2, w_3, \ldots, w_N$, respectively, may sum N values obtained by the multiplication, may add an offset "b" to a summed value, and may generate one output value (e.g., "z") by applying a value to which the offset "b" is added to a specific function "σ".

In some example embodiments and as illustrated in FIG. 2B, one layer included in the neural network illustrated in FIG. 2A may include M nodes ND, where M is a natural number greater than or equal to two, and output values of the one layer may be obtained by Equation 1.

$$W*A=Z \qquad \text{[Equation 1]}$$

In Equation 1, "W" denotes weights for all connections included in the one layer, and may be implemented in an M*N matrix form. "A" denotes the N inputs $a_1$ to $a_N$ received by the one layer, and may be implemented in an N*1 matrix form. "Z" denotes M outputs $z_1, z_2, z_3, \ldots, z_M$ output from the one layer, and may be implemented in an M*1 matrix form. The inputs $a_1$ to $a_N$ may be expressed as "x", e.g., $x_1, x_2, x_3, \ldots, x_N$, and the outputs $z_1$ to $z_M$ may be expressed as "y", e.g., $y_1, y_2, y_3, \ldots, y_M$.

Figure 3A:
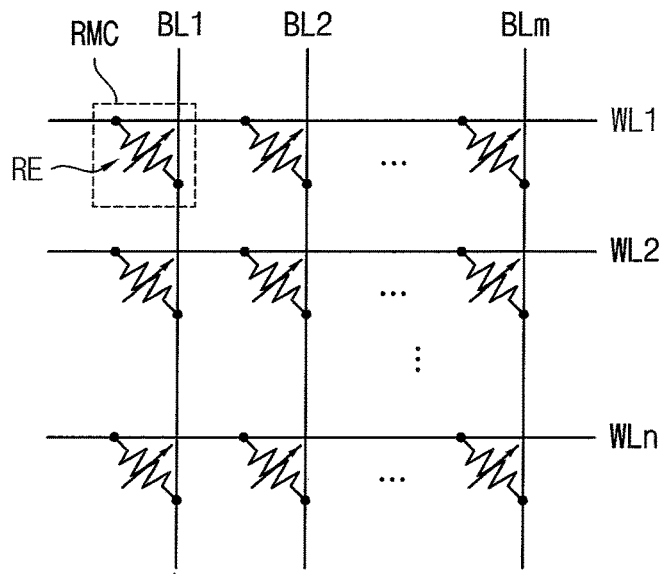
FIGS. 3A, 3B and 3C are diagrams illustrating a first memory cell array included in a neuromorphic computing device according to example embodiments.
Figure 3B:
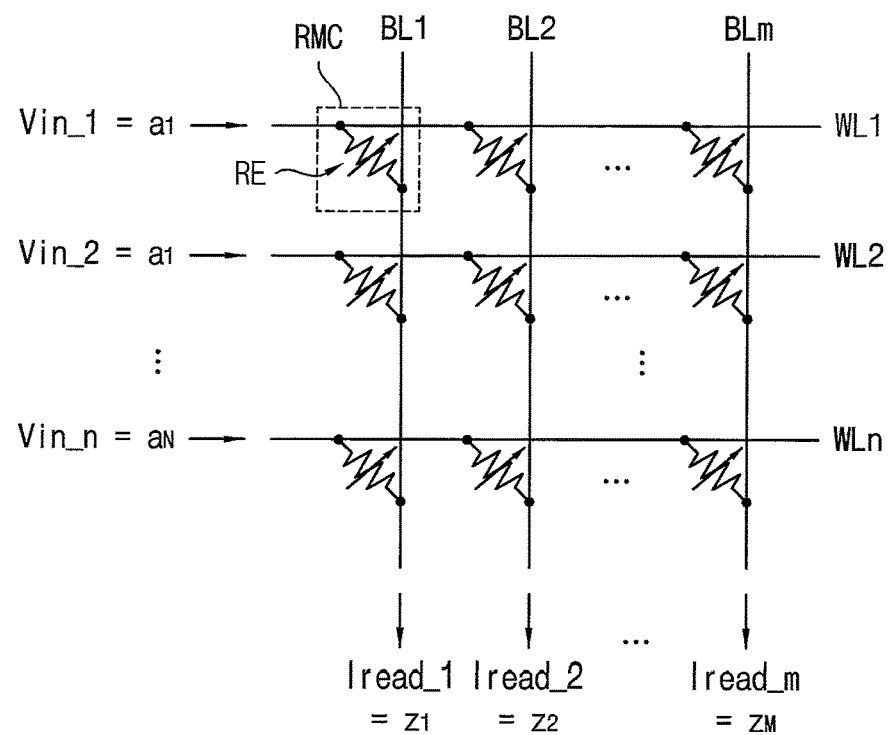
Figure 3C:
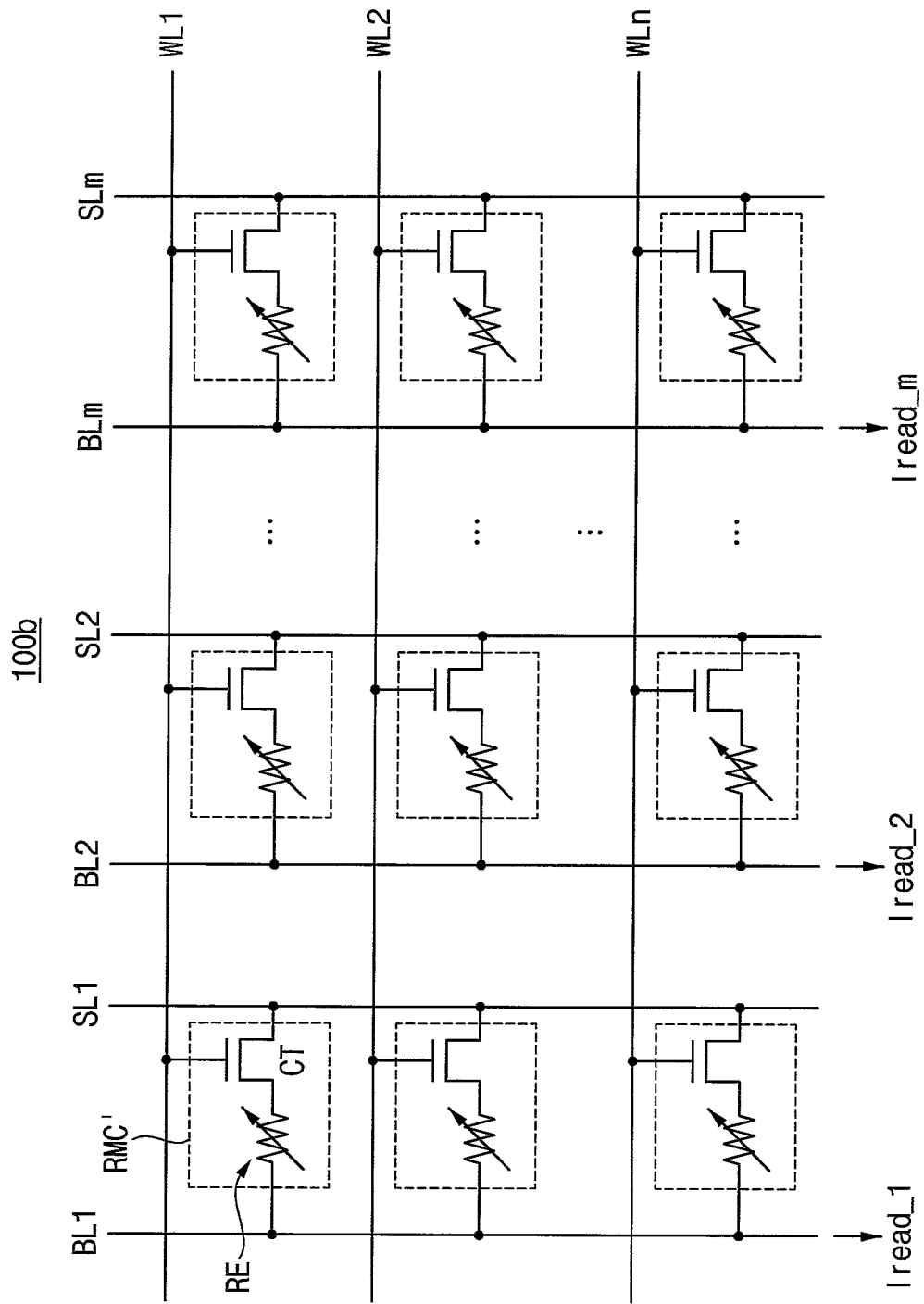

FIGS. 3A, 3B and 3C are diagrams illustrating examples of a first memory cell array included in a neuromorphic computing device according to example embodiments.

Referring to FIG. 3A, a first memory cell array 100a may include a plurality of resistive memory cells RMC disposed in regions where a plurality of wordlines WL1, WL2, . . . , WLn and a plurality of bitlines BL1, BL2, . . . , BLm intersect. For example, the plurality of wordlines WL1 to WLn may correspond to a plurality of rows, and the plurality of bitlines BL1 to BLm may correspond to a plurality of columns. For example, the plurality of wordlines WL1 to WLn may include first to n-th wordlines, and the plurality of bitlines BL1 to BLm may include first to m-th bitlines. Each of the plurality of resistive memory cells RMC may include a resistive element RE, and may be connected to a respective one of the plurality of wordlines WL1 to WLn at one end and a respective one of the plurality of bitlines BL1 to BLm at the other end.

A resistance of the resistive element RE may be changed based on voltages applied through the plurality of wordlines WL1 to WLn and/or the plurality of bitlines BL1 to BLm, and the plurality of resistive memory cells RMC may store a plurality of data by the change in the resistance of the resistive element RE. For example, based on a write voltage being applied to a selected wordline among the plurality of wordlines WL1 to WLn and a ground voltage (e.g., about 0V) being applied to a selected bitline among the plurality of bitlines BL1 to BLm, the device may write data '1' into a selected resistive memory cell, and the selected resistive memory cell may have a low resistance state. Based on the ground voltage being applied to the selected wordline and the write voltage being applied to the selected bitline, the device may write data '0' into the selected resistive memory cell, and the selected resistive memory cell may have a high resistance state. Further, based on a read voltage being applied to the selected wordline and the ground voltage being applied to the selected bitline, the device may read or retrieve data written in the selected resistive memory cell.

In some example embodiments, each of the plurality of resistive memory cells RMC may include one of various resistive memory cells, e.g., a phase change random access memory (PRAM) cell, a resistance random access memory (RRAM) cell, a magnetic random access memory (MRAM) cell, a ferroelectric random access memory (FRAM) cell, or the like.

In some example embodiments, the resistive element RE may include or may be formed of a phase change material that changes its crystalline state depending on the amount of a current. The phase change material may include one or more of various materials such as gallium antimonide (GaSb), indium antimonide (InSb), indium selenide (InSe), antimony telluride ($Sb_2Te_3$), germanium telluride (GeTe) in which two elements are combined, germanium antimony telluride (GeSbTe), gallium selenium telluride (GaSeTe), indium antimony telluride (InSbTe), tin antimony telluride ($SnSb_2Te_4$), indium antimony germanide (InSbGe) in which three elements are combined, and silver indium antimony telluride (AgInSbTe), germanium tin antimony telluride ((GeSn)SbTe), germanium antimony selenium telluride (GeSb(SeTe)), $Te_{81}Ge_{15}Sb_2S_2$ in which four elements are combined. In other example embodiments, the resistive element RE may include or may be formed of a perovskite compound, a transition metal oxide, a magnetic material, a ferromagnetic material, or an anti-ferromagnetic material, instead of the phase change material. However, the materials included in the resistive element RE are not limited thereto.

Referring to FIG. 3B, an example in which the first memory cell array 100a of FIG. 3A performs the operation described with reference to FIGS. 2A and 2B is illustrated.

Each resistive memory cell RMC may correspond to one synapse or connection in the neural network system, and may store one weight. Thus, m*n data stored in the first memory cell array 100a may correspond to a weight matrix that includes the weights included in the one layer described with reference to FIGS. 2A and 2B. For example, the m*n data may correspond to "W" that is implemented in the M*N matrix form in Equation 1.

In FIG. 3B, n input voltages (or read voltages) Vin_1, Vin_2, . . . , Vin_n applied through the plurality of wordlines WL1 to WLn may correspond to an input matrix that includes the N inputs $a_1$ to $a_N$ received by the one layer described with reference to FIGS. 2A and 2B. For example, the n input voltages Vin_1 to Vin_n may correspond to "A" that is implemented in the N*1 matrix form in Equation 1.

In addition, m read currents Iread_1, Iread_2, . . . , Iread_m output through the plurality of bitlines BL1 to BLm may correspond to an output matrix that includes the M outputs $z_1$ to $z_M$ output from the one layer described with reference to FIGS. 2A and 2B. For example, the m read currents Iread_1 to Iread_m may correspond to "Z" that is implemented in the M*1 matrix form in Equation 1.

Based on the first memory cell array 100a being implemented by storing the plurality of weights having a matrix form in the plurality of resistive memory cells RMC, and based on the input voltages Vin_1 to Vin_n corresponding to the plurality of inputs being provided through the plurality of wordlines WL1 to WLn, the device may generate the read currents Iread_1 to Iread_m output through the plurality of bitlines BL1 to BLm that correspond to the result of the multiplication and accumulation operations performed by the neural network system. By implementing the at least one layer in the neural network system in this manner, the neuromorphic computing device may perform the data storage and computational operations at once.

Referring to FIG. 3C, a first memory cell array 100b may include a plurality of resistive memory cells RMC' disposed in regions where a plurality of wordlines WL1 to WLn intersect a plurality of bitlines BL1 to BLm and a plurality of source lines SL1, SL2, . . . , SLm. For example, the plurality of source lines SL1 to SLm may include first to m-th source lines. The descriptions repeated with FIG. 3A will be omitted.

Each of the plurality of resistive memory cells RMC' may include a cell transistor CT and a resistive element RE, and may be connected to a respective one of the plurality of wordlines WL1 to WLn, a respective one of the plurality of bitlines BL1 to BLm and a respective one of the plurality of source lines SL1 to SLm. For example, the cell transistor CT may include a first electrode (such as a drain, source, collector, or emitter) connected to one of the plurality of source lines SL1 to SLm, a second electrode (such as a source, drain, emitter, or collector, which may be opposite to the first electrode), and a third electrode (such as a gate electrode or a base electrode) connected to one of the plurality of wordlines WL1 to WLn. The resistive element RE may be connected between the second electrode of the cell transistor CT and one of the plurality of bitlines BL1 to BLm.

For example, referring to FIG. 3C, based on a power supply voltage (e.g., VCC) being applied to a wordline WL1, a write voltage being applied to a bitline BL1, and a ground voltage being applied to a source line S1, the device may write data '1' into the resistive memory cell RMC', and the resistive memory cell RMC' may have a low resistance state. Based on the power supply voltage being applied to the wordline WL1, the ground voltage being applied to the bitline BL1, the write voltage being applied to the source line S1, the device may write data '0' into the resistive memory cell RMC', and the resistive memory cell RMC' may have a high resistance state. Further, based on the power supply voltage being applied to the wordline S1, a read voltage being applied to the bitline BL1, and the ground voltage being applied to the source line S1, the device may read or retrieve data written in the resistive memory cell RMC'.

As with that described with reference to FIG. 3B, the first memory cell array 100b may output the plurality of read currents Iread_1 to Iread_m. Although FIG. 3C illustrates that the plurality of read currents Iread_1 to Iread_m are output through the plurality of bitlines BL1 to BLm, example embodiments are not limited thereto. For example, the plurality of read currents Iread_1 to Iread_m may be output through the plurality of source lines SL1 to SLm.

Although FIGS. 3A, 3B and 3C illustrate that the first memory cell arrays 100a and 100b have a two-dimensional (2D) array structure, example embodiments are not limited thereto. For example, a first memory cell array may be formed in a three-dimensional (3D) or vertical array structure. In addition, a configuration or a structure of the resistive memory cells RMC and RMC' may be changed according to example embodiments.

Hereinafter, example embodiments will be described based on the first memory cell array 100b of FIG. 3C.

Figure 4:
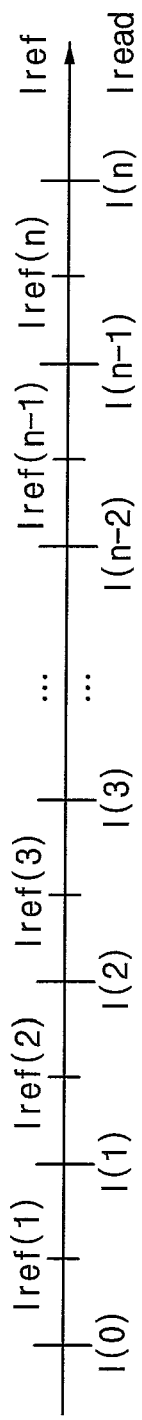
FIG. 4 is a diagram for describing an operation of a neuromorphic computing device according to an example embodiment.

FIG. 4 is a diagram for describing an operation of a neuromorphic computing device according to example embodiments.

Referring to FIG. 4, an example of current levels of a read current Iread generated from the first memory cell array 100b and an example of current levels of a reference current Iref generated from the second memory cell array 200 are illustrated.

As described above, when the plurality of wordlines WL1 to WLn include the first to n-th wordlines, each of the plurality of read currents Iread_1 to Iread_m output from the first memory cell array 100b may have one of the first to (n+1)-th current levels I(0), I(1), I(2), I(3), . . . , I(n−2), I(n−1), I(n). Among the first to (n+1)-th current levels I(0) to I(n), the first current level I(0) may be the lowest current level, and the (n+1)-th current level I(n) may be the highest current level. The first to (n+1)-th current levels I(0) to I(n) may be referred to as first to (n+1)-th MAC current values.

Each of the plurality of read currents Iread_1 to Iread_m may have one of the first to (n+1)-th current levels I(0) to I(n) depending on data stored in the plurality of resistive memory cells RMC included in the first memory cell array 100b. For example, one column may be formed by resistive memory cells connected to one bitline and/or one source line, and a current level of one read current may be determined based on data stored in resistive memory cells connected to one column.

For example, a case in which the first read current Iread_1 is generated based on n resistive memory cells included in a first column, which is connected to the first bitline BL1 and/or the first source line SL1 and connected to the first to n-th wordlines WL1 to WLn, will be described below. As described above, a resistive memory cell in which data '0' is written may have a high resistance state, and a resistive memory cell in which data '1' is written may have a low resistance state. When data '0' is written into all of the n resistive memory cells in a first column, a resistance of the entire first column may have the largest value, and thus the first read current Iread_1 may have the first current level I(0), which is the lowest current level. In contrast, when data '1' is written into all of the n resistive memory cells in the first column, the resistance of the entire first column may have the smallest value, and thus the first read current Iread_1 may have the (n+1)-th current level I(n), which is the highest current level. When data '1' is written into one resistive memory cell and data '0' is written into the remaining (n−1) resistive memory cells, the first read current Iread_1 may have the second current level I(1) higher than the first current level I(0). When data '0' is written into one resistive memory cell and data '1' is written into the remaining (n−1) resistive memory cells, the first read current Iread_1 may have the n-th current level I(n−1) lower than the (n+1)-th current level I(n). In this example, indices (e.g., 0, 1, 2, 3, . . . , n−2, n−1, n) in parentheses of the first to (n+1)-th current levels I(0) to I(n) may represent the number of resistive memory cells in which data '1' is written.

The plurality of reference currents Iref_1 to Iref_n may include first to n-th reference currents. For example, the first reference current Iref1 may have a first reference current level Iref(1). The second reference current Iref2 may have a second reference current level Iref(2). The third reference current may have a third reference current level Iref(3). The (n−1)th reference current may have an (n−1)-th reference current level Iref(n−1). The n-th reference current Iref_n may have an n-th reference current level Iref(n).

A current level of an i-th reference current among the first to n-th reference currents Iref_1 to Iref_n may be between an i-th current level and an (i+1)-th current level among the first to (n+1)-th current levels I(0) to I(n), where i is a natural number greater than or equal to one and less than or equal to n. For example, the first reference current level Iref(1) of the first reference current Iref1 may be between the first and second current levels I(0) and I(1). The second reference current level Iref(2) of the second reference current Iref2 may be between the second and third current levels I(1) and I(2). The third reference current level Iref(3) of a third reference current may be between the third and fourth current levels I(2) and I(3). The (n−1)-th reference current level Iref(n−1) of an (n−1)-th reference current may be between the (n−1)-th and n-th current levels I(n−2) and I(n−1). The n-th reference current level Iref(n) of the n-th reference current Iref_n may be between the n-th and (n+1)-th current levels I(n−1) and I(n).

As described above, ideally, the current level of the one reference current may be formed at the center between the current levels of the two adjacent read currents. Accordingly, in the neuromorphic computing device 10 according to example embodiments, the i-th reference current may be generated such that the current level of the i-th reference current is obtained by averaging the i-th current level and the (i+1)-th current level. For example, the current level of the reference current may be obtained based on Equation 2.

$$Iref(mac)=\{I(mac+1)+I(mac)\}/2 \quad \text{[Equation 2]}$$

In Equation 2, "mac" denotes a natural number greater than or equal to one and less than or equal to n, and mac=i. For example, the first reference current Iref1 may be generated such that the first reference current level Iref(1) is obtained by averaging the first and second current levels I(0) and I(1). The first reference current Iref1 may be used to judge or determine whether the read current has the first current level I(0) or the second current level I(1).

Figure 5:
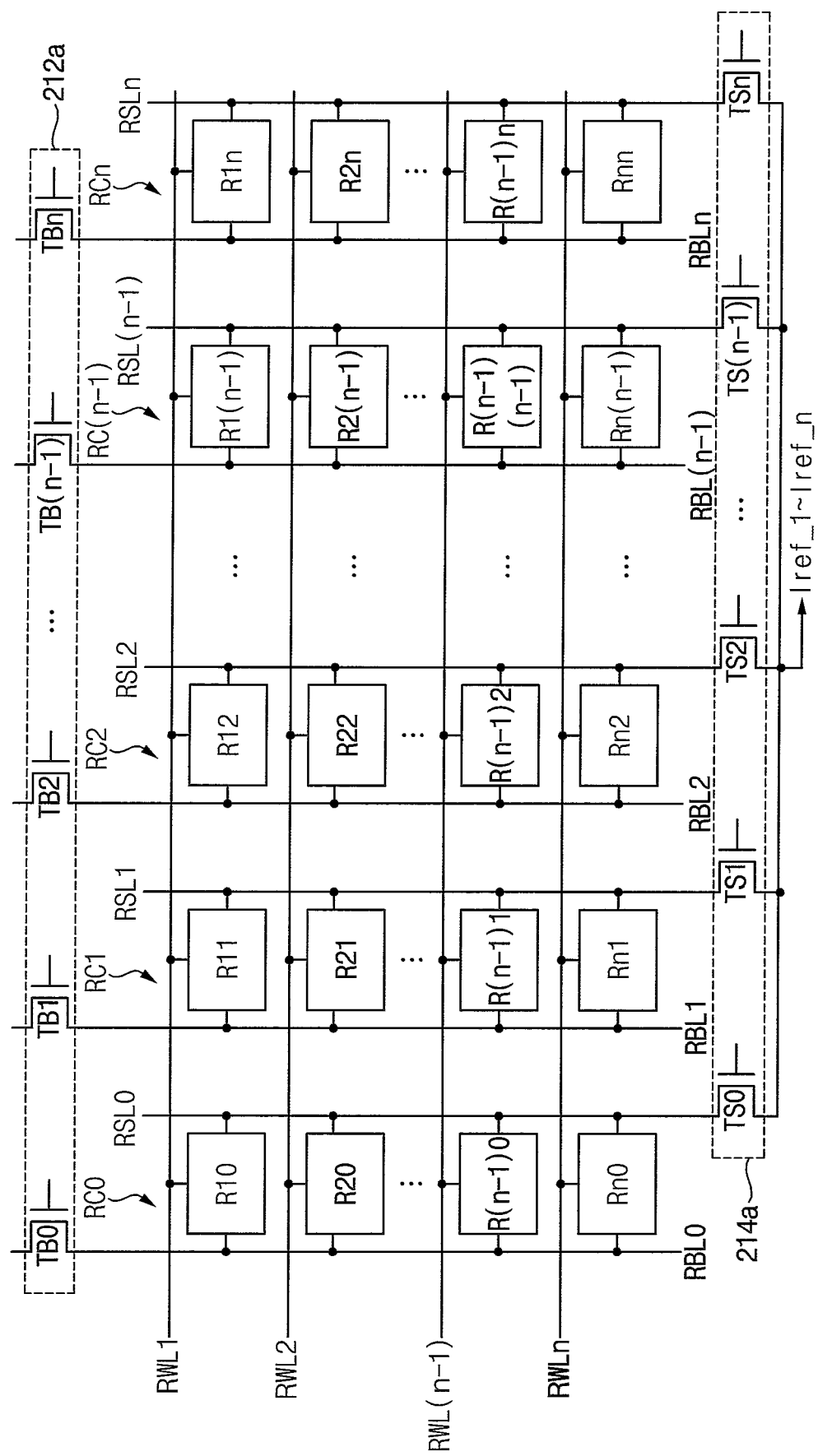
FIG. 5 is a diagram illustrating a second memory cell array included in a neuromorphic computing device according to an example embodiment.

FIG. 5 is a diagram illustrating an example of a second memory cell array included in a neuromorphic computing device according to example embodiments.

Referring to FIG. 5, a second memory cell array 200a may include a plurality of reference resistive memory cells R10, R20, . . . , R(n−1)0, Rn0, R11, R21, . . . , R(n−1)1, Rn1, R12, R22, . . . , R(n−1)2, Rn2, . . . , R1(n−1), R2(n−1), . . . , R(n−1)(n−1), Rn(n−1), R1n, R2n, . . . , R(n−1)n, Rnn disposed in regions where a plurality of reference wordlines RWL1, RWL2, . . . , RWL(n−1), RWLn intersect a plurality of reference bitlines RBL0, RBL1, RBL2, . . . , RBL(n−1), RBLn and a plurality of reference source lines RSL0, RSL1, RSL2, . . . , RSL(n−1), RSLn. The second memory cell array 200a may include driving circuits 212a and 214a for an averaging operation. The second memory cell array 200a may have a configuration similar to that of the first memory cell array 100b of FIG. 3C. Therefore, the descriptions provided with respect to FIG. 3C will be omitted.

The plurality of reference wordlines RWL1 to RWLn may include first to n-th reference wordlines. The plurality of reference bitlines RBL0 to RBLn may include first to (n+1)-th reference bitlines. The plurality of reference source lines RSL0 to RSLn may include first to (n+1)-th reference source lines. Each of the plurality of reference resistive memory cells R10 to Rn0, R11 to Rn1, R12 to Rn2, . . . , R1(n−1) to Rn(n−1) and R1n to Rnn may have a configuration substantially the same as that of each of the plurality of resistive memory cells RMC' in FIG. 3C, which include a cell transistor and a resistive element. The driving circuit 212a may include first to (n+1)-th transistors TB0, TB1, TB2, . . . , TB(n−1), TBn that are respectively connected to the first to (n+1)-th reference bitlines RBL0 to RBLn. The driving circuit 214a may include first to (n+1)-th transistors TS0, TS1, TS2, . . . , TS(n−1), TSn that are respectively connected to the first to (n+1)-th reference source lines RSL0 to RSLn. The driving circuits 212a and 214a may correspond to the averaging circuit 210 in FIG. 1.

A first reference column RC0 may include the reference resistive memory cells R10 to Rn0 that are connected to the first reference bitline RBL0 and the first reference source line RSL0. A second reference column RC1 may include the reference resistive memory cells R11 to Rn1 that are connected to the second reference bitline RBL1 and the second reference source line RSL1. A third reference column RC2 may include the reference resistive memory cells R12 to Rn2 that are connected to the third reference bitline RBL2 and the third reference source line RSL2. An n-th reference column RC(n−1) may include the reference resistive memory cells R1(n−1) to Rn(n−1) that are connected to the n-th reference bitline RBL(n−1) and the n-th reference source line RSL(n−1). An (n+1)-th reference column RCn may be formed by the reference resistive memory cells R1n to Rnn that are connected to the (n+1)-th reference bitline RBLn and the (n+1)-th reference source line RSLn.

Figure 6B:
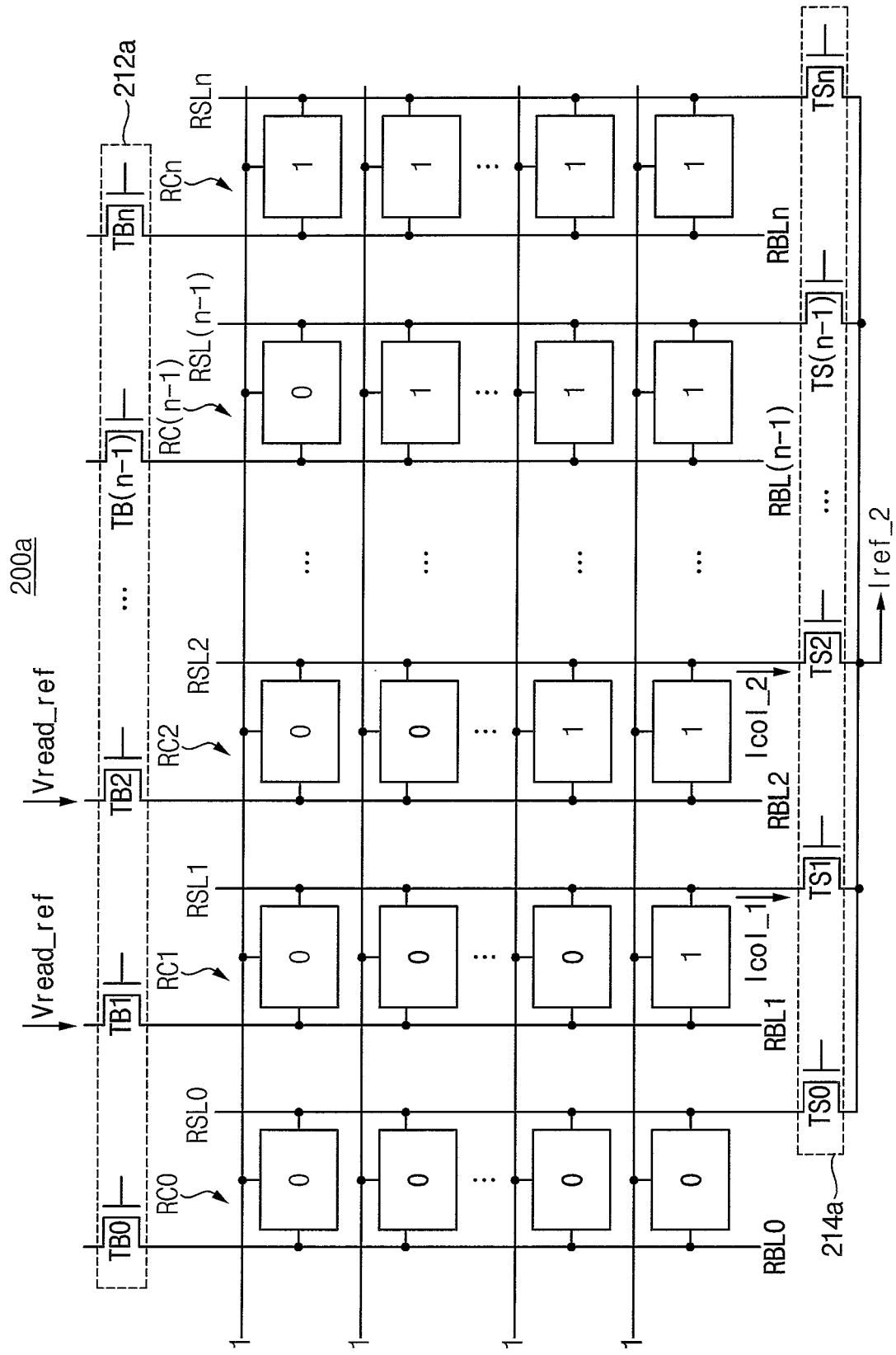
Figure 6C:
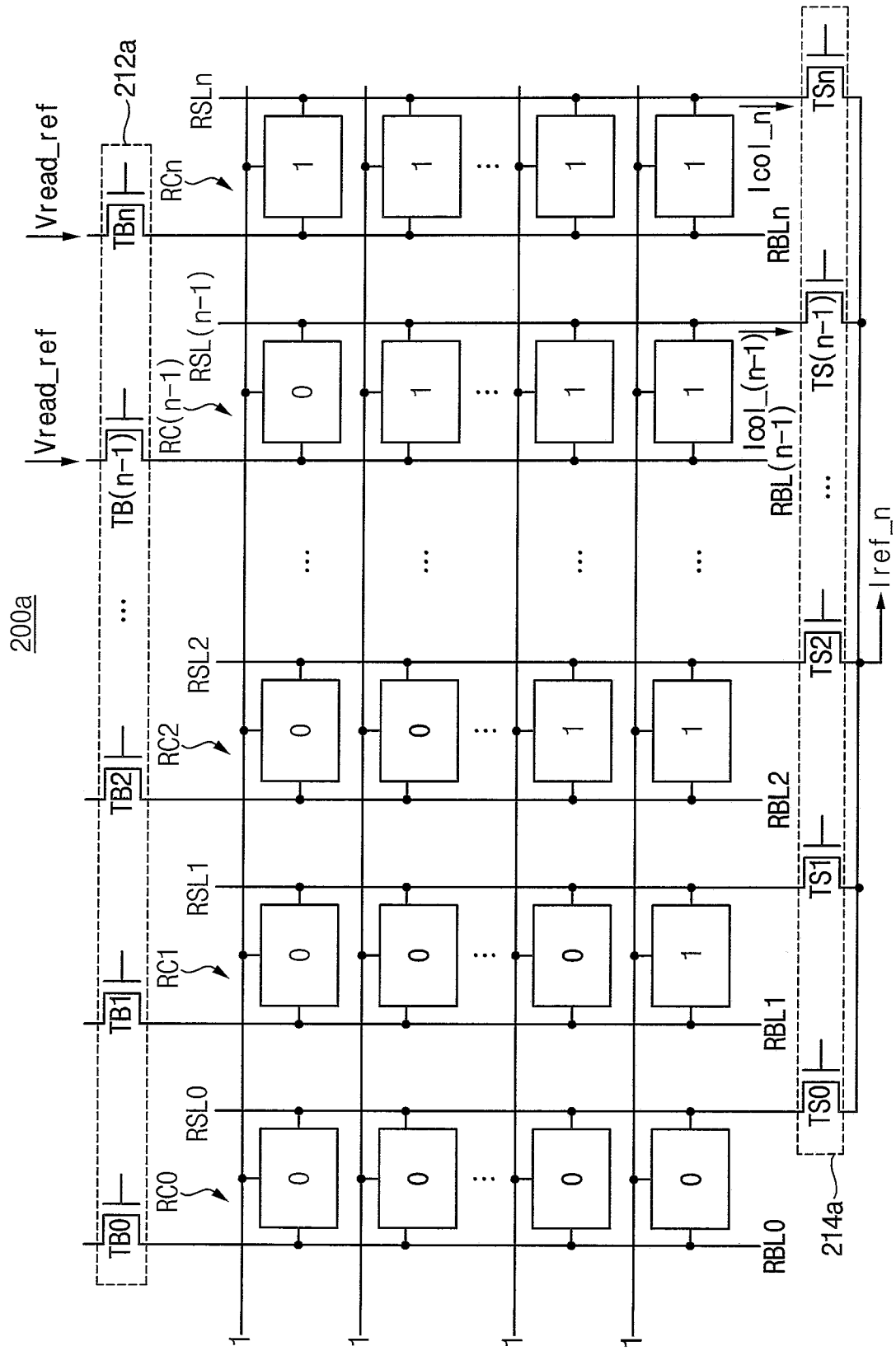

The first to (n+1)-th reference columns RC0 to RCn may generate first to (n+1)-th column currents (e.g., Icol_0, Icol_1, Icol_2, . . . , Icol_(n−1), Icol_n in FIGS. 6A, 6B and 6C), respectively. The first to (n+1)-th column currents may have the first to (n+1)-th current levels I(0) to I(n), respectively. The first to n-th reference currents Iref_1 to Iref_n may be generated based on the first to (n+1)-th column currents. A detailed operation of generating the first to n-th reference currents Iref_1 to Iref_n will be described with reference to FIGS. 6A, 6B and 6C.

FIGS. 6A, 6B and 6C are diagrams for describing an operation of a second memory cell array of FIG. 5.

Referring to FIGS. 4, 5, 6A, 6B and 6C, one of the first to n-th reference currents Iref_1 to Iref_n may be generated by averaging two adjacent column currents among the first to (n+1)-th column currents Icol_0, Icol_1, Icol_2, . . . , Icol_(n−1) and Icol_n. The first to n-th reference currents Iref_1 to Iref_n may be sequentially generated. For example, the first reference current Iref_1 may be generated first as illustrated in FIG. 6A, and the second reference current Iref_2 may be generated next as illustrated in FIG. 6B, and then the n-th reference current Iref_n may be generated at last as illustrated in FIG. 6C. For example, two adjacent reference bitlines among the first to (n+1)-th reference bitlines RBL0 to RBLn may be sequentially driven using the transistors TB0 to TBn, and two adjacent reference source lines among the first to (n+1)-th reference source lines RSL0 to RSLn may be sequentially driven using the transistors TS0 to TSn.

For example, in the first reference column RC0, data '0' may be written into all of the reference resistive memory cells R10 to Rn0. In the second reference column RC1, data '1' may be written into one resistive memory cell Rn1 among the reference resistive memory cells R11 to Rn1, and data '0' may be written into the remaining resistive memory cells R11 to R(n−1)1 among the reference resistive memory cells R11 to Rn1. In the third reference column RC2, data '1' may be written into two resistive memory cells R(n−1)2 and Rn2 among the reference resistive memory cells R12 to Rn2, and data '0' may be written into the remaining resistive memory cells R12, R22, . . . among the reference resistive memory cells R12 to Rn2. In the n-th reference column RC(n−1), data '0' may be written into one resistive memory cell R1(n−1) among the reference resistive memory cells R1(n−1) to Rn(n−1), and data '1' may be written into the remaining resistive memory cells R2(n−1) to Rn(n−1) among the reference resistive memory cells R1(n−1) to Rn(n−1). In the (n+1)-th reference column RCn, data '1' may be written into all of the reference resistive memory cells R1n to Rnn.

When the first to n-th reference currents Iref_1 to Iref_n are to be generated, voltages under a fixed condition may be applied to the first to n-th reference wordlines RWL1 to RWLn by the wordline driver 300. For example, voltages (e.g., reference wordline driving voltages) having a first level may be applied to all of the first to n-th reference wordlines RWL1 to RWLn. The first level may correspond to a logic high level (e.g., '1').

As illustrated in FIG. 6A, a reference read voltage Vread_ref may be applied to the first reference bitline RBL0 by turning on the transistor TB0, and the first reference column RC0 may generate the first column current Icol_0 having the first current level I(0) based on the reference read voltage Vread_ref. Similarly, the reference read voltage Vread_ref may be applied to the second reference bitline RBL1 by turning on the transistor TB1, and the second reference column RC1 may generate the second column current Icol_1 having the second current level I(1) based on the reference read voltage Vread_ref. In addition, the transistors TS0 and TS1 may be turned on, and the first reference current Iref_1 having the first reference current level Iref(1) may be generated and output by averaging the first and second column currents Icol_0 and Icol_1.

In some example embodiments, to implement (I(0)+I(1))/2=Iref(1), a voltage level of the reference read voltage Vread_ref applied to the second memory cell array 200a may be about a half of a voltage level of a read voltage (e.g., Vread) applied to the first memory cell array 100b (e.g., Vread_ref=Vread/2). For example, the read voltage Vread_ref may represent a voltage applied to the bitlines of the first memory cell array 100b.

As illustrated in FIG. 6B, the reference read voltage Vread_ref may be applied to the second reference bitline RBL1 by turning on the transistor TB1, and the second reference column RC1 may generate the second column current Icol_1 having the second current level I(1) based on the reference read voltage Vread_ref. Similarly, the reference read voltage Vread_ref may be applied to the third reference bitline RBL2 by turning on the transistor TB2, and the third reference column RC2 may generate the third column current Icol_2 having the third current level I(2) based on the reference read voltage Vread_ref. In addition, the transistors TS1 and TS2 may be turned on, and the second reference current Iref_2 having the second reference current level Iref(2) may be generated and output by averaging the second and third column currents Icol_1 and Icol_2.

As illustrated in FIG. 6C, the reference read voltage Vread_ref may be applied to the n-th reference bitline RBL(n−1) by turning on the transistor TB(n−1), and the n-th reference column RC(n−1) may generate the n-th column current Icol_(n−1) having the n-th current level I(n−1) based on the reference read voltage Vread_ref. Similarly, the reference read voltage Vread_ref may be applied to the (n+1)-th reference bitline RBLn by turning on the transistor TBn, and the (n+1)-th reference column RCn may generate the (n+1)-th column current Icol_n having the (n+1)-th current level I(n) based on the reference read voltage Vread_ref. In addition, the transistors TS(n−1) and TSn may be turned on, and the n-th reference current Iref_n having the n-th reference current level Iref(n) may be generated and output by averaging the n-th and (n+1)-th column currents Icol (n−1) and Icol_n.

As described above, when the first to n-th reference currents Iref_1 to Iref_n are sequentially generated, a current level of each reference current may be substantially equal to an average of two corresponding current levels (or MAC current values), and may be centered between the two adjacent current levels at an arbitrary temperature and time without any offset resistor.

Figure 7:
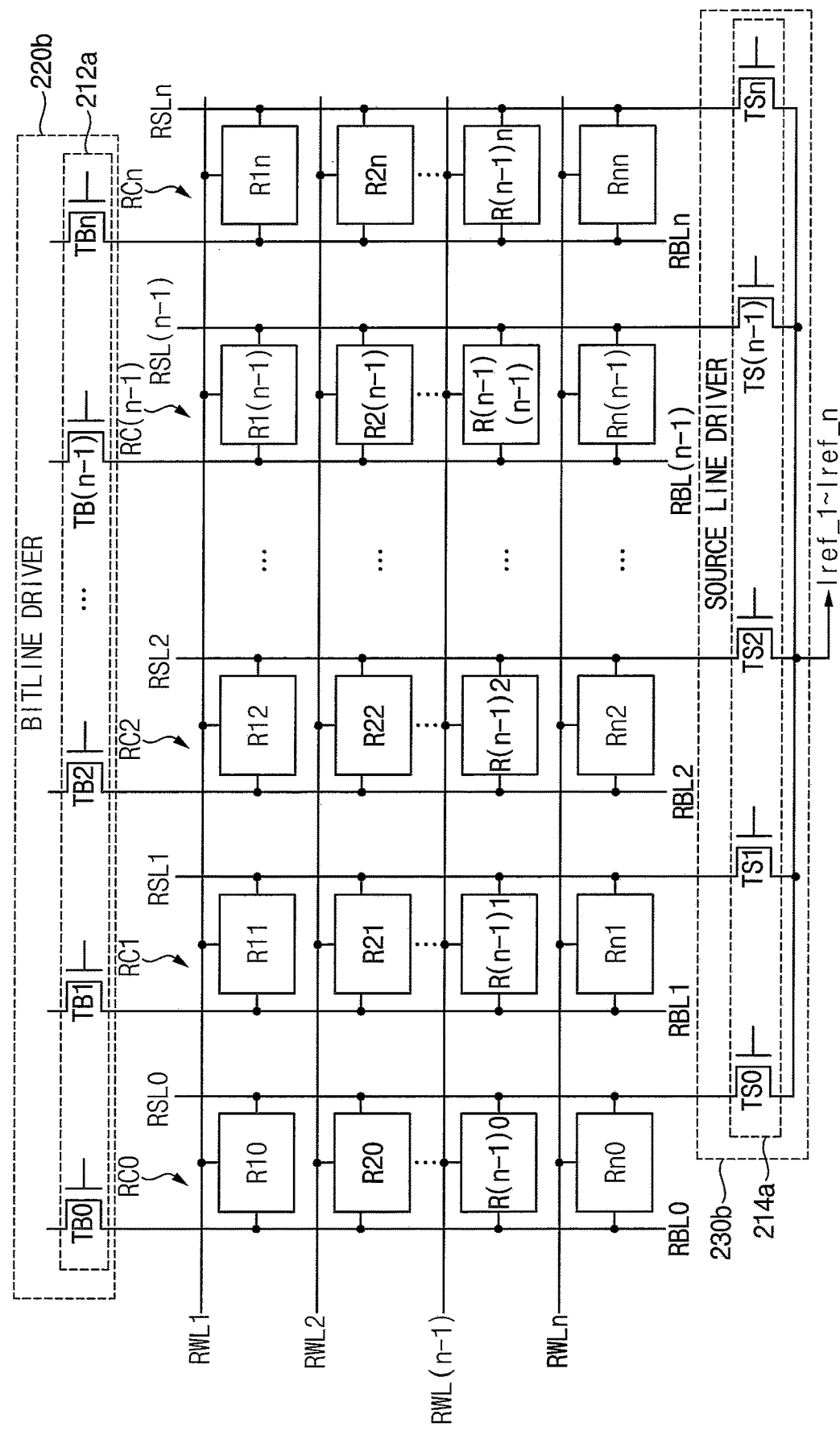
FIG. 7 is a diagram illustrating a second memory cell array included in a neuromorphic computing device according to an example embodiment.

FIG. 7 is a diagram illustrating a second memory cell array included in a neuromorphic computing device according to an example embodiment. The descriptions repeated with FIG. 5 will be omitted.

Referring to FIG. 7, a neuromorphic computing device including a second memory cell array 200b may further include a bitline driver 220b that drives the first to (n+1)-th reference bitlines RBL0 to RBLn, and a source line driver 230b that drives the first to (n+1)-th reference source lines RSL0 to RSLn. The second memory cell array 200b of FIG. 7 may be substantially the same as the second memory cell array 200a of FIG. 5, except that the driving circuit 212a and the driving circuit 214a are included in the bitline driver 220b and the source line driver 230b, respectively.

The bitline driver 220b may generate control signals applied to gate electrodes of the transistors TB0 to TBn, and the source line driver 230b may generate control signals applied to gate electrodes of the transistors TS0 to TSn. In addition, desired or target data may be written into the plurality of reference resistive memory cells R10 to Rn0, R11 to Rn1, R12 to Rn2, . . . , R1(n−1) to Rn(n−1) and R1n to Rnn using the bitline driver 220b driving transistors TB0 to Tbn and the source line driver 230b driving transistors TS0 to TSn. In some example embodiments, when each reference resistive memory cell includes a bipolar element such as a spin-transfer torque (STT) MRAM cell, both the bitline driver 220*b* and the source line driver 230*b* may be used in a data write operation. In other example embodiments, when each reference resistive memory cell includes a unipolar element such as a phase-change memory (PCM) cell, only the bitline driver 220*b* may be used in a data write operation, and the source line driver 230*b* may not be required and may be omitted.

Figure 9:
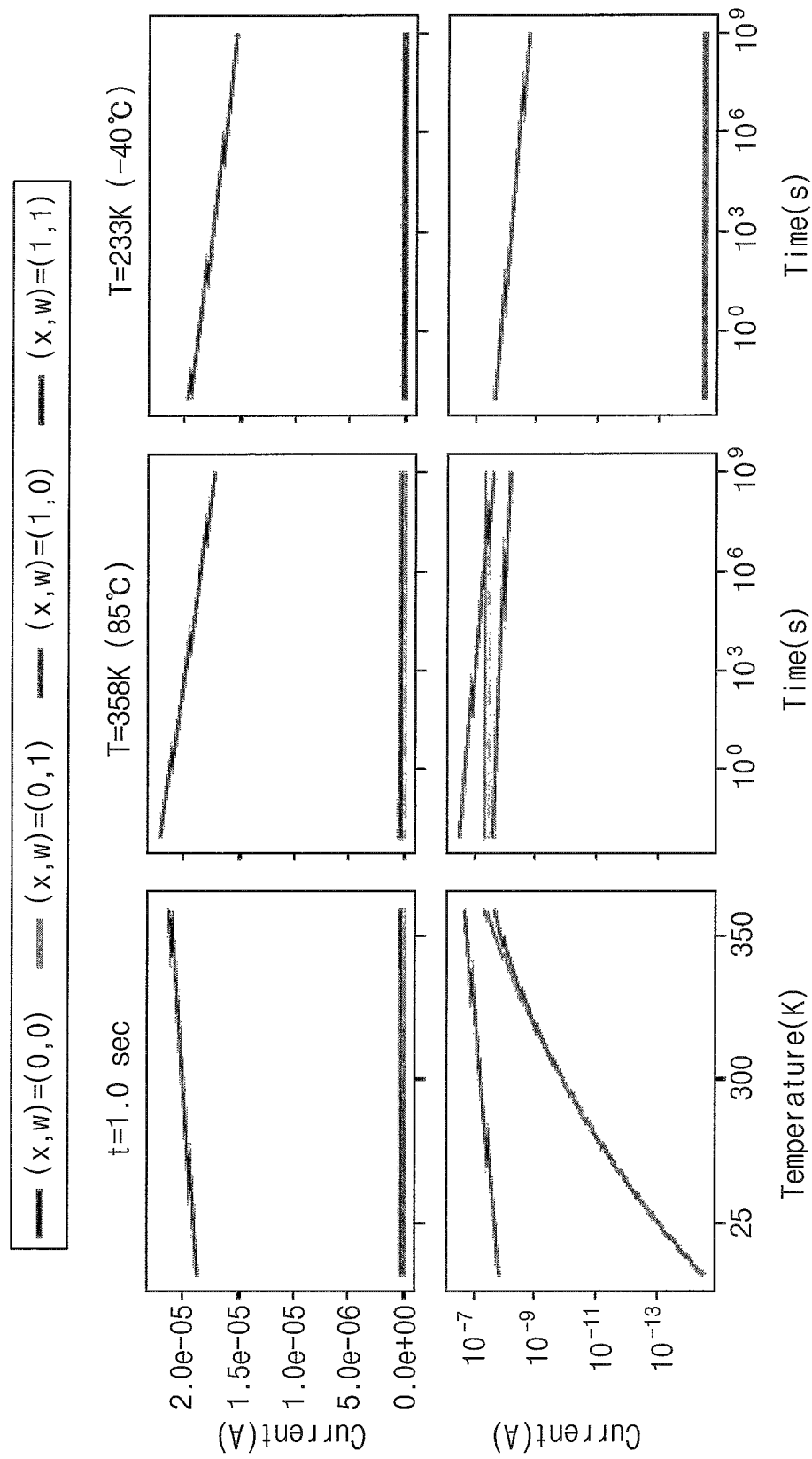
Figure 10:
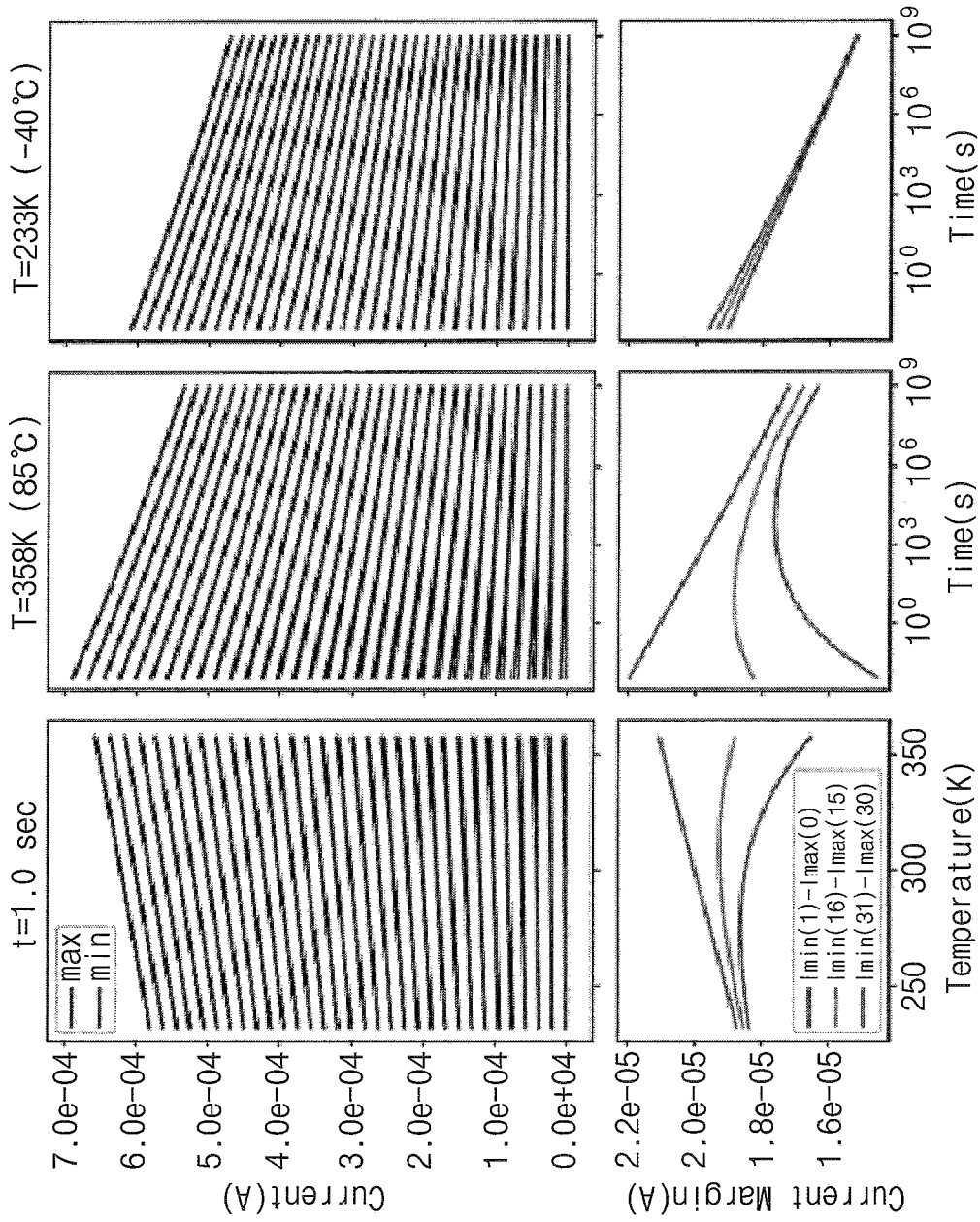

FIGS. 8, 9 and 10 are diagrams for describing characteristics of a neuromorphic computing device according to example embodiments.

When the averaging operation for generating the reference currents is performed according to example embodiments, it is necessary to consider an offset of each resistive memory cell to improve or enhance the accuracy and/or to guarantee or ensure the maximum sensing margin. For example, a read current output from each resistive memory cell may vary depending on a bit value input to the resistive memory cell and a bit value stored in the resistive memory cell, and thus the column currents may be generated in consideration of such variation.

Referring to FIG. 8, a change in the read current depending on an input bit and a stored bit of each resistive memory cell is illustrated.

In each resistive memory cell, an output bit value "x*w" (e.g., an output bit or a level of a read current) may be determined by multiplying an input bit value "x" (e.g., a level of an input voltage) input through the wordline by a stored bit value "w" (e.g., a weight bit).

As illustrated in FIG. 8, the output bit value x*w may corresponds to '0' when at least one of the input bit value x and the stored bit value w corresponds to '0', and the output bit value x*w may correspond to '1' when both the input bit value x and the stored bit value w correspond to '1'. When the input bit value x corresponds to '0' and '1', the read current output from each resistive memory cell may correspond to an off-state current Ioff and an on-state current Ion of the cell transistor CT, respectively. When the stored bit value w corresponds to '0' and '1', the read current output from each resistive memory cell may correspond to a high resistance state Rhigh and a low resistance state Rlow of each resistive memory cell, respectively.

Therefore, when the output bit value x*w corresponds to '1', the read current output from each resistive memory cell may correspond to only one case: Ion(Rlow). However, when the output bit value x*w corresponds to '0', the read current output from each resistive memory cell may correspond to one of three cases: Ioff (Rhigh), Ioff (Rlow) and Ioff (Rhigh).

Referring to FIG. 9, changes of the read current (or cell current) in FIG. 8 output from each resistive memory cell depending on changes in temperature and time are illustrated.

In FIG. 9, graphs in a first column represent the change of the read current depending on the change in temperature when the time from the writing to the measuring (e.g., the measuring time) is fixed to about 1 second. Graphs in a second column represent the change of the read current depending on the change in time when the temperature at which the current is measured (e.g., the measuring temperature) is fixed at about 358K (e.g., about 85 degrees Celsius). Graphs in a third column represent the change of the read current depending on the change in time when the temperature at which the current is measured is fixed at about 233K (e.g., about −40 degrees Celsius). In addition, each of the graphs in a second row represents an enlarged view of a lower region of a corresponding graph in a first row.

As illustrated in FIG. 9, in cases of Ion(Rlow) and Ion(Rhigh), e.g., in cases of (x,w)=(1,1) and (x,w)=(1,0), it can be seen that the read current depends on temperature and time dependency of the low resistance state Rlow and the high resistance state Rhigh. In addition, in cases of Ioff (Rlow) and Ioff(Rhigh), e.g., in cases of (x,w)=(0,1) and (x,w)=(0,0), it can be seen that the read current depends on temperature and time dependency of the cell transistor CT, the low resistance state Rlow and the high resistance state Rhigh.

Referring to FIG. 10, temperature and time dependency of a plurality of current levels (e.g., MAC current values) that a read current output from each resistive memory cell may have is illustrated. FIG. 10 illustrates an example in which the number of the wordlines WL1 to WLn is thirty one, e.g., n=31.

As with that described with reference to FIG. 9, in FIG. 10, graphs in a first column represent the changes of the MAC current values depending on the change in temperature when a time from the writing operation to a time of measuring a MAC current value is fixed to about 1 second. Graphs in a second column represent the changes of the MAC current values depending on the change in time when the temperature at which the current is measured is fixed at about 358K (e.g., about 85 degrees Celsius). Graphs in a third column represent the changes of the MAC current values depending on the change in time when the temperature at which the current is measured is fixed at about 233K (e.g., about −40 degrees Celsius).

In FIG. 10, graphs in a first row represent 32 MAC current values from "mac0" at the bottom to "mac31" at the top, and each MAC current value may have a distribution between the maximum value and the minimum value. A read current output from one bitline may have one of the 32 MAC current values. For example, when all bit values output from 31 resistive memory cells connected to one bitline correspond to '0', the read current may have the MAC current value corresponding to "mac0" at the bottom. For example, when all bit values output from 31 resistive memory cells connected to one bitline correspond to '1', the read current may have the MAC current value corresponding to "mac31" at the top. As described with reference to FIG. 4, mac0 and mac31 may be expressed as I(0) and I(31), respectively.

In addition, in FIG. 10, each of the graphs in a second row represents current margins of a corresponding graph in the first row, and each current margin represents an interval between two adjacent MAC current values considering the maximum value and the minimum value. For example, Imin(1)−Imax(0) represents a difference between the minimum value of mac1 and the maximum value of mac0, Imin(16)−Imax(15) represents a difference between the minimum value of mac16 and the maximum value of mac15, and Imin(31)−Imax(30) represents a difference between the minimum value of mac31 and the maximum value of mac30.

As described with reference to FIGS. 8 and 9, when the output bit value x*w corresponds to '0', the read current output from each resistive memory cell may correspond to one of three cases of Ioff (Rhigh), Ioff (Rlow) and Ioff (Rhigh), and thus the MAC current values may also have a distribution based on a combination of the above-described three cases. As illustrated in the graphs in the first row of FIG. 10, a difference between the maximum value and the minimum value of two adjacent MAC current values may be negligible in most cases. However, as illustrated in the graphs in the second row of FIG. 10, when the temperature at which the current is measured is relatively high and a time from the writing operation to a time of measuring the current is relatively short (e.g., when the resistance is relatively low, the leakage of the cell transistor CT is relatively large and the amount of the cell current is relatively large), a relatively large difference between the maximum value and the minimum value of two adjacent MAC current values may occur (e.g., separation of the maximum and minimum values may occur).

Figure 11:
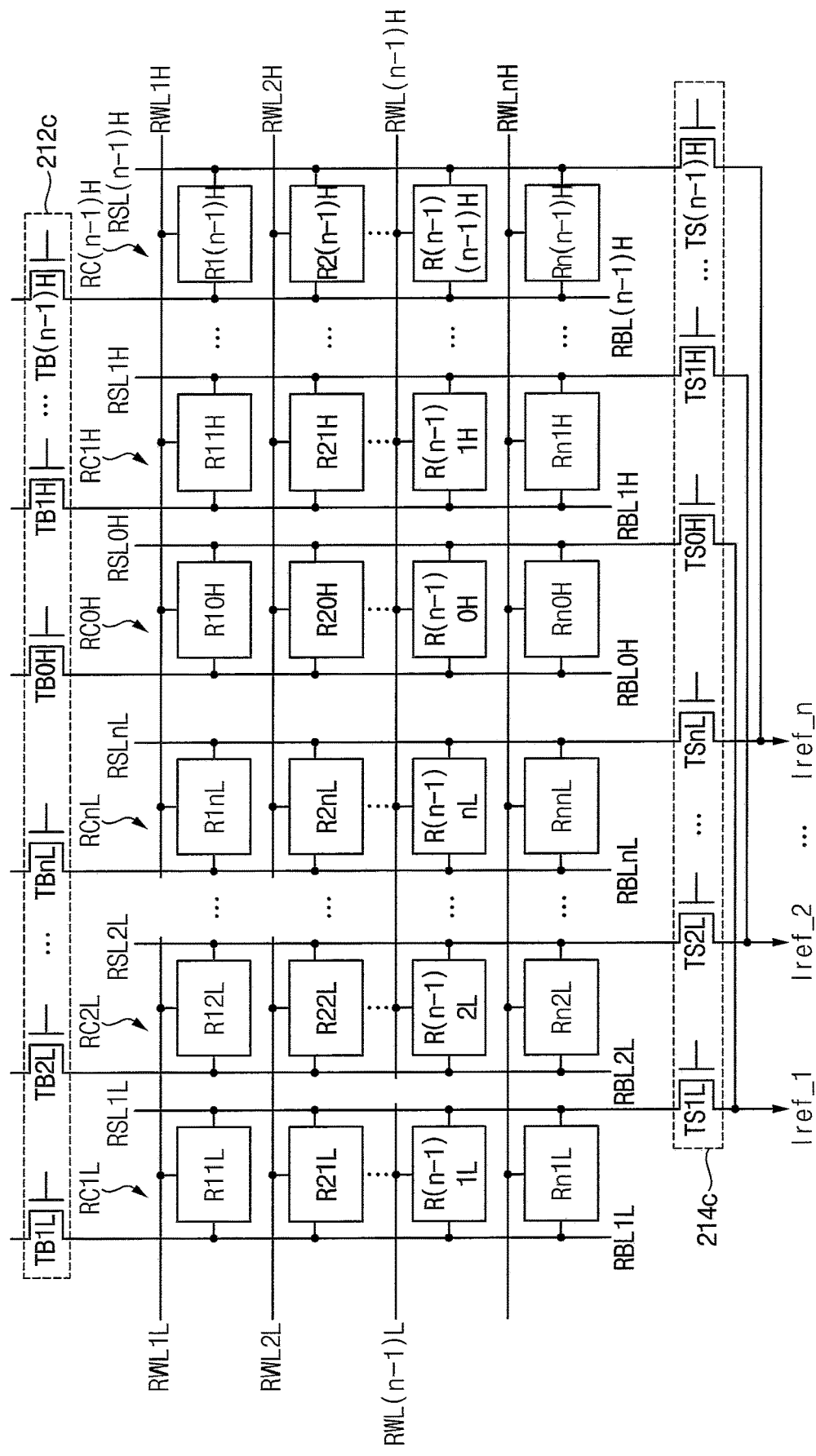
FIG. 11 is a diagram illustrating a second memory cell array included in a neuromorphic computing device according to an example embodiment.

FIG. 11 is a diagram illustrating a second memory cell array included in a neuromorphic computing device according to an example embodiment. The descriptions repeated with FIG. 5 will be omitted.

Referring to FIG. 11, a second memory cell array 200c may include a plurality of reference resistive memory cells R10H, R20H, . . . , R(n−1)0H, Rn0H, R11H, R21H, . . . , R(n−1)1H, Rn1H, . . . , R1(n−1)H, R2(n−1)H, . . . , R(n−1)(n−1)H, Rn(n−1)H, R11L, R21L, . . . , R(n−1)1L, Rn1L, R12L, R22L, . . . , R(n−1)2L, Rn2L, . . . , R1nL, R2nL, . . . , R(n−1)nL, RnnL disposed in regions where a plurality of reference wordlines RWL1H, RWL2H, . . . , RWL(n−1)H, RWLnH, RWL1L, RWL2L, . . . , RWL(n−1)L intersect with a plurality of reference bitlines RBL0H, RBL1H, . . . , RBL(n−1)H, RBL1L, RBL2L, . . . , RBLnL and a plurality of reference source lines RSL0H, RSL1H, . . . , RSL(n−1)H, RSL1L, RSL2L, . . . , RSLnL. The second memory cell array 200c may include driving circuits 212c and 214c for an averaging operation.

The plurality of reference wordlines RWL1H to RWLnH and RWL1L to RWL(n−1)L may include first to n-th reference wordlines RWL1H to RWLnH and (n+1)-th to (2n−1)-th reference wordlines RWL1L to RWL(n−1)L. The plurality of reference bitlines RBL0H to RBL(n−1)H and RBL1L to RBLnL may include first to n-th reference bitlines RBL0H to RBL(n−1)H and (n+1)-th to 2n-th reference bitlines RBL1L to RBLnL. The plurality of reference source lines RSL0H to RSL(n−1)H and RSL1L to RSLnL may include first to n-th reference source lines RSL0H to RSL(n−1)H and (n+1)-th to 2n-th reference source lines RSL1L to RSLnL. Each of the plurality of reference resistive memory cells R10H to Rn0H, R11H to Rn1H, R1(n−1)H to Rn(n−1)H, R11L to Rn1L, R12L to Rn2L, R1nL to RnnL may have a configuration substantially the same as that of each of the plurality of resistive memory cells RMC' in FIG. 3C. The driving circuit 212c may include first to n-th transistors TB0H, TB1H, . . . , TB(n−1)H and (n+1)-th to 2n-th transistors TB1L, TB2L, . . . , TBnL. The driving circuit 214c may include first to n-th transistors TS0H, TS1H, . . . , TS(n−1)H and (n+1)-th to 2n-th transistors TS1L, TS2L, . . . , T SnL.

A first reference column RC0H may be formed by the reference resistive memory cells R10H to Rn0H that are connected to the first reference bitline RBL0H and the first reference source line RSL0H. A second reference column RC1H may be formed by the reference resistive memory cells R11H to Rn1H that are connected to the second reference bitline RBL1H and the second reference source line RSL1H. An n-th reference column RC(n−1)H may be formed by the reference resistive memory cells R1(n−1)H to Rn(n−1)H that are connected to the n-th reference bitline RBL(n−1)H and the n-th reference source line RSL(n−1)H. An (n+1)-th reference column RC1L may be formed by the reference resistive memory cells R11L to Rn1L that are connected to the (n+1)-th reference bitline RBL1L and the (n+1)-th reference source line RSL1L. An (n+2)-th reference column RC2L may be formed by the reference resistive memory cells R12L to Rn2L that are connected to the (n+2)-th reference bitline RBL2L and the (n+2)-th reference source line RSL2L. A 2n-th reference column RCnL may be formed by the reference resistive memory cells R1nL to RnnL that are connected to the 2n-th reference bitline RBLnL and the 2n-th reference source line RSLnL.

To perform the averaging operation in consideration of the maximum and minimum values of the MAC current values described with reference to FIGS. 8, 9 and 10, the second memory cell array 200c of FIG. 11 may include the first to n-th reference columns RC0H to RC(n−1)H that generate and output the maximum values of the MAC current values, and the (n+1)-th to 2n-th reference columns RC1L to RCnL that generate and output the minimum values of the MAC current values. For example, the first to n-th reference columns RC0H to RC(n−1)H may generate first to n-th column currents (e.g., Icol_0max, Icol_1max, . . . , Icol_(n−1)max in FIG. 12), respectively. The first to n-th column currents may have the first to n-th current levels I(0) to I(n−1), respectively, among the first to (n+1)-th current levels I(0) to I(n), and may correspond to the maximum values of the MAC current values. The (n+1)-th to 2n-th reference columns RC1L to RCnL may generate (n+1)-th to 2n-th column currents (e.g., Icol_1min, Icol_2min, . . . , Icol_nmin in FIG. 12), respectively. The (n+1)-th to 2n-th column currents may have the second to (n+1)-th current levels I(1) to I(n), respectively, among the first to (n+1)-th current levels I(0) to I(n), and may correspond to the minimum values of the MAC current values.

In addition, to generate the first to n-th column currents corresponding to the maximum values of the MAC current values and the (n+1)-th to 2n-th column currents corresponding to the minimum values of the MAC current values, the second memory cell array 200c of FIG. 11 may include the first to n-th reference wordlines RWL1H to RWLnH that are connected to all of the first to n-th reference columns RC0H to RC(n−1)H and some or a part of the (n+1)-th to 2n-th reference columns RC1L to RCnL, and the (n+1)-th to (2n−1)-th reference wordlines RWL1L to RWL(n−1)L that are connected to the others or remaining of (n+1)-th to 2n-th reference columns RC1L to RCnL. The first to n-th reference wordlines RWL1H to RWLnH and the (n+1)-th to (2n−1)-th reference wordlines RWL1L to RWL(n−1)L may be electrically isolated, insulated and/or disconnected from each other.

The first to n-th reference currents Iref_1 to Iref_n may be generated based on the first to n-th column currents and the (n+1)-th to 2n-th column currents. A detailed operation of generating the first to n-th reference currents Iref_1 to Iref_n will be described with reference to FIG. 12.

Figure 12:
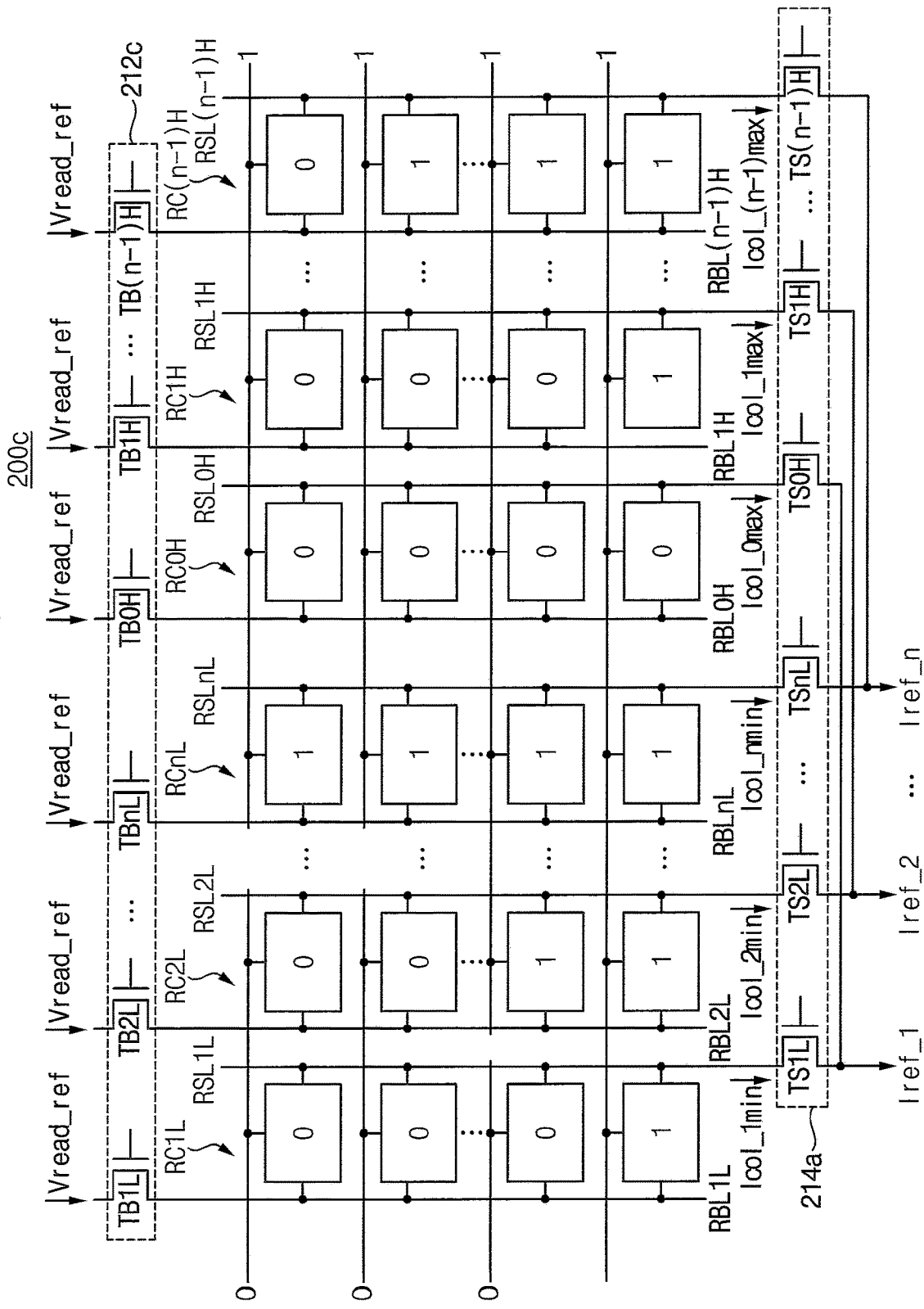
FIG. 12 is a diagram for describing an operation of a second memory cell array of FIG. 11.

FIG. 12 is a diagram for describing an operation of a second memory cell array of FIG. 11. The descriptions repeated with FIGS. 6A, 6B and 6C will be omitted.

Referring to FIGS. 4, 11 and 12, one of the first to n-th reference currents Iref_1 to Iref_n may be generated by averaging one of first to n-th column currents Icol_0max, Icol_1max, . . . , Icol_(n−1)max and one of (n+1)-th to 2n-th column currents Icol_1min, Icol_2min, . . . , Icol_nmin. The first to n-th reference currents Iref_1 to Iref_n may be substantially simultaneously or concurrently generated. For example, the reference bitlines RBL0H to RBL(n−1)H and RBL1L to RBLnL may be substantially simultaneously driven using the transistors TB0H to TB(n−1)H and TB1L to TBnL, and the reference source lines RSL0H to RSL(n−1)H and RSL1L to RSLnL may be substantially simultaneously driven using the transistors TS0H to TS(n−1)H and TS1L to TSnL.

For example, in the first reference column RC0H, data '0' may be written into all of the reference resistive memory cells R10H to Rn0H. In the second reference column RC1H, data '1' may be written into one resistive memory cell Rn1H among the reference resistive memory cells R11H to Rn1H, and data '0' may be written into the remaining resistive memory cells R11H to R(n−1)1H among the reference resistive memory cells R11H to Rn1H. In the n-th reference column RC(n−1)H, data '0' may be written into one resistive memory cell R1(n−1)H among the reference resistive memory cells R1(n−1)H to Rn(n−1)H, and data '1' may be written into the remaining resistive memory cells R2(n−1)H to Rn(n−1)H among the reference resistive memory cells R1(n−1)H to Rn(n−1)H. In the (n+1)-th reference column RC1L, data '1' may be written into one resistive memory cell Rn1L among the reference resistive memory cells R11L to Rn1L, and data '0' may be written into the remaining resistive memory cells R11L to R(n−1)1L among the reference resistive memory cells R11L to Rn1L. In the (n+2)-th reference column RC2L, data '1' may be written into two resistive memory cells R(n−1)2L and Rn2L among the reference resistive memory cells R12L to Rn2L, and data '0' may be written into the remaining resistive memory cells R12L, R22L, . . . among the reference resistive memory cells R12L to Rn2L. In the 2n-th reference column RCnL, data '1' may be written into all of the reference resistive memory cells R1nL to RnnL.

When the first to n-th reference currents Iref_1 to Iref_n are to be generated, voltages under a fixed condition may be applied to all of the plurality of reference wordlines RWL1H to RWLnH and RWL1L to RWL(n−1)L by the wordline driver 300. In addition, a first condition of voltages applied to the first to n-th reference wordlines RWL1H to RWLnH may be different from a second condition of voltages applied to the (n+1)-th to (2n−1)-th reference wordlines RWL1L to RWL(n−1)L. For example, voltages having a first level may be applied to all of the first to n-th reference wordlines RWL1H to RWLnH, and voltages having a second level different from the first level may be applied to all of the (n+1)-th to (2n−1)-th reference wordlines RWL1L to RWL(n−1)L. The first level may correspond to a high logic level (e.g., '1'), and the second level may correspond to a low logic level (e.g., '0').

In other words, in the (n+1)-th to 2n-th reference columns RC1L to RCnL, the voltages having the second level may be applied to the reference wordlines connected to the reference resistive memory cells in which data '0' is stored, and the voltages having the first level may be applied to the reference wordlines connected to the reference resistive memory cells in which data '1' is stored. In the first to n-th reference columns RC0H to RC(n−1)H, the voltages having the first level may be applied to the reference wordlines connected to all reference resistive memory cells. The reference wordlines may be implemented to apply the voltages by the above-described manner. For example, two reference wordlines (e.g., RWL1H and RWL1L) may be formed by cutting a portion of one metal wiring.

As described above, to generate the (n+1)-th to 2n-th column currents Icol_1min to Icol_nmin corresponding to the minimum values of the MAC current values, the wordline of the resistive memory cell in which data '0' is stored (e.g., the resistive memory cell having the high resistance state) may be turned off to output the leakage of the cell transistor, and the wordline of the resistive memory cell in which data '1' is stored (e.g., the resistive memory cell having the low resistance state) may be turned on to allow a corresponding current to flow. To generate the first to n-th column currents Icol_0max to Icol_(n−1)max corresponding to the maximum values of the MAC current values, the wordline of the resistive memory cell in which data '0' is stored may also be turned on to output the Ion current depending on the resistance, and thus all wordlines may be turned on regardless of stored data.

As illustrated in FIG. 12, the reference read voltage Vread_ref may be applied to the reference bitlines RBL0H to RBL(n−1)H and RBL1L to RBLnL by turning on the transistors TB0H to TB(n−1)H and TB1L to TBnL, respectively. The first to n-th reference columns RC1L to RCnL may generate the first to n-th column currents Icol_0min to Icol_nmin based on the reference read voltage Vread_ref, and the (n+1)-th to 2n-th reference columns RC0H to RC(n−1)H may generate the (n+1)-th to 2n-th column currents Icol_0max to Icol_(n−1)max based on the reference read voltage Vread_ref. In addition, when the transistors TS0H to TS(n−1)H and TS1L to TSnL are turned on, the first reference current Iref_1 having the first reference current level Iref(1) may be generated and output by averaging the first and (n+1)-th column currents Icol_1min and Icol_0max, the second reference current Iref_2 having the second reference current level Iref(2) may be generated and output by averaging the second and (n+2)-th column currents Icol_2min and Icol_1max, and the n-th reference current Iref_n having the n-th reference current level Iref(n) may be generated and output by averaging the n-th and 2n-th column currents Icol_nmin and Icol_(n−1)max.

As described above, when the first to n-th reference currents Iref_1 to Iref_n are substantially simultaneously generated, a current level of each reference current may be substantially equal to an average of two corresponding current levels (or MAC current values), and may be centered between the two corresponding current levels at an arbitrary temperature and time without any offset resistor.

Figure 13:
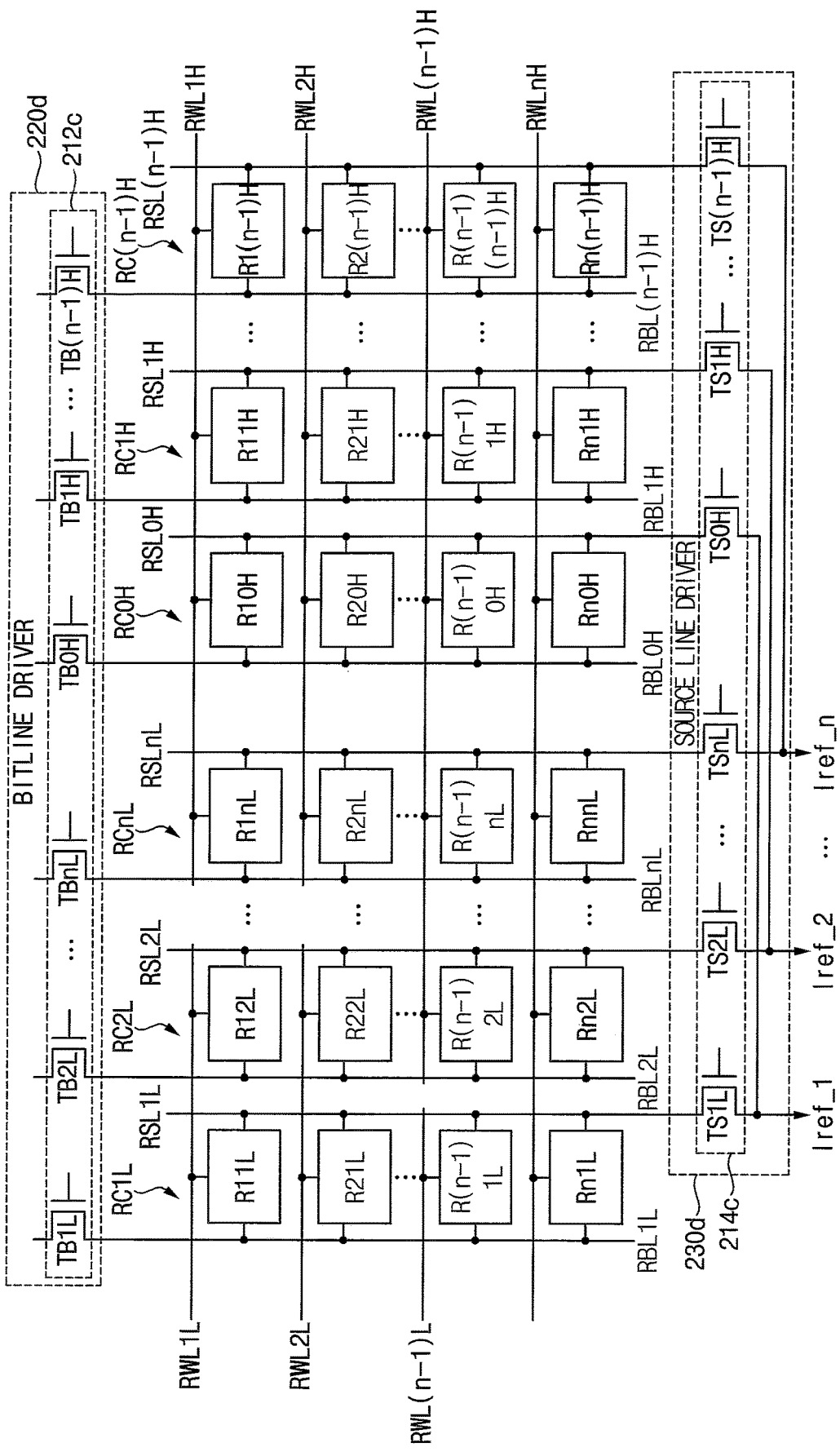
FIG. 13 is a diagram illustrating a second memory cell array included in a neuromorphic computing device according to an example embodiment.

FIG. 13 is a diagram illustrating an example of a second memory cell array included in a neuromorphic computing device according to example embodiments. The descriptions provided above with reference to FIGS. 7 and 11 will be omitted.

Referring to FIG. 13, a neuromorphic computing device including a second memory cell array 200*d* may further include a bitline driver 220*d* that drives the plurality of reference bitlines RBL0H to RBL(n−1)H and RBL1L to RBLnL, and a source line driver 230*d* that drives the plurality of reference source lines RSL0H to RSL(n−1)H and RSL1L to RSLnL. The second memory cell array 200*d* of FIG. 13 may be substantially the same as the second memory cell array 200*c* of FIG. 11, except that the driving circuit 212*c* and the driving circuit 214*c* are included in the bitline driver 220*d* and the source line driver 230*d*, respectively. The bitline driver 220*d* and the source line driver 230*d* may be substantially the same as those described with reference to FIG. 7.

FIGS. 14, 15, 16, 17A, 17B, 17C, 18A, 18B, 18C, 18D, 18E and 18F are diagrams for describing an operation of a neuromorphic computing device according to example embodiments.

Figure 14:
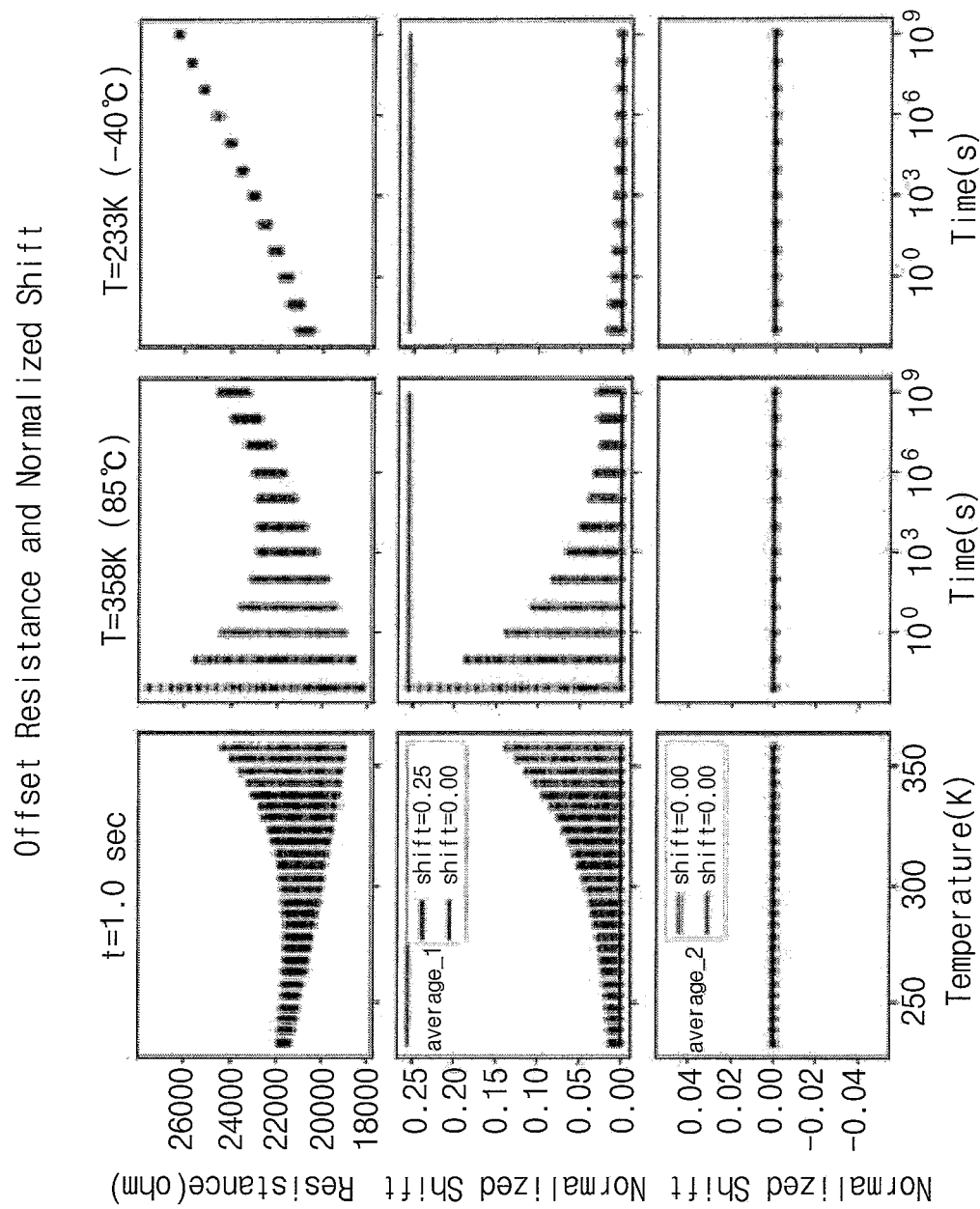
FIGS. 14, 15, 16, 17A, 17B, 17C, 18A, 18B, 18C, 18D, 18E and 18F are diagrams for describing an operation of a neuromorphic computing device according to example embodiments.
Figure 15:
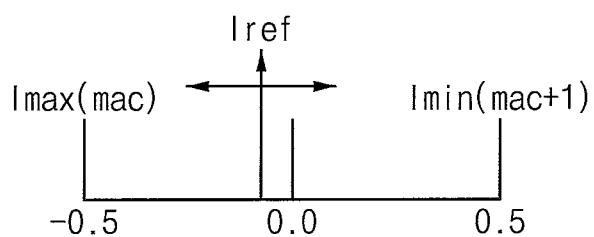

Referring to FIGS. 14 and 15, simulation results based on the examples of FIGS. 5 and 7 and the examples of FIGS. 11 and 13 are illustrated.

As described with reference to FIGS. 9 and 10, referring to FIG. 14, graphs in a first column represent the simulation results depending on the change in temperature when the time from the writing to the measuring is fixed to about 1 second. Graphs in a second column represent the simulation results depending on the change in time when the temperature at which the current is measured is fixed at about 358K (e.g., about 85 degrees Celsius). Graphs in a third column represent the simulation results depending on the change in time when the temperature at which the current is measured is fixed at about 233K (e.g., about −40 degrees Celsius).

In FIG. 14, graphs in a first row represent the simulation results based on a related art technique using offset resistors. Graphs in a second row (e.g., average_1) represent the simulation results based on the examples of FIGS. 5 and 7, and particularly to a normalized shift with respect to the examples of FIGS. 5 and 7. Graphs in a third row (e.g., average_2) represent the simulation results based on the examples of FIGS. 11 and 13, and particularly to a normalized shift with respect to the examples of FIGS. 11 and 13. For example, the normalized shift may be understood as illustrated in FIG. 15.

As described with reference to FIGS. 8, 9 and 10, the interval between adjacent MAC current values (e.g., the MAC current margin) may depend on the temperature, the time and the reference column. In the examples of FIGS. 5 and 7, there may be an improved effect compared to the related art technique, however, the minimum values of the MAC current values may not be considered, e.g., average values may be obtained only using the maximum values, and thus the normalized shift may be improved but may be still biased to one side. In the examples of FIGS. 11 and 13, the normalized shift may be symmetrical and the bias may be removed at a given range irrespective of temperature and time, and thus each reference current may be substantially centered between the neighboring MAC current values and may provide a normalized distribution.

Figure 16:
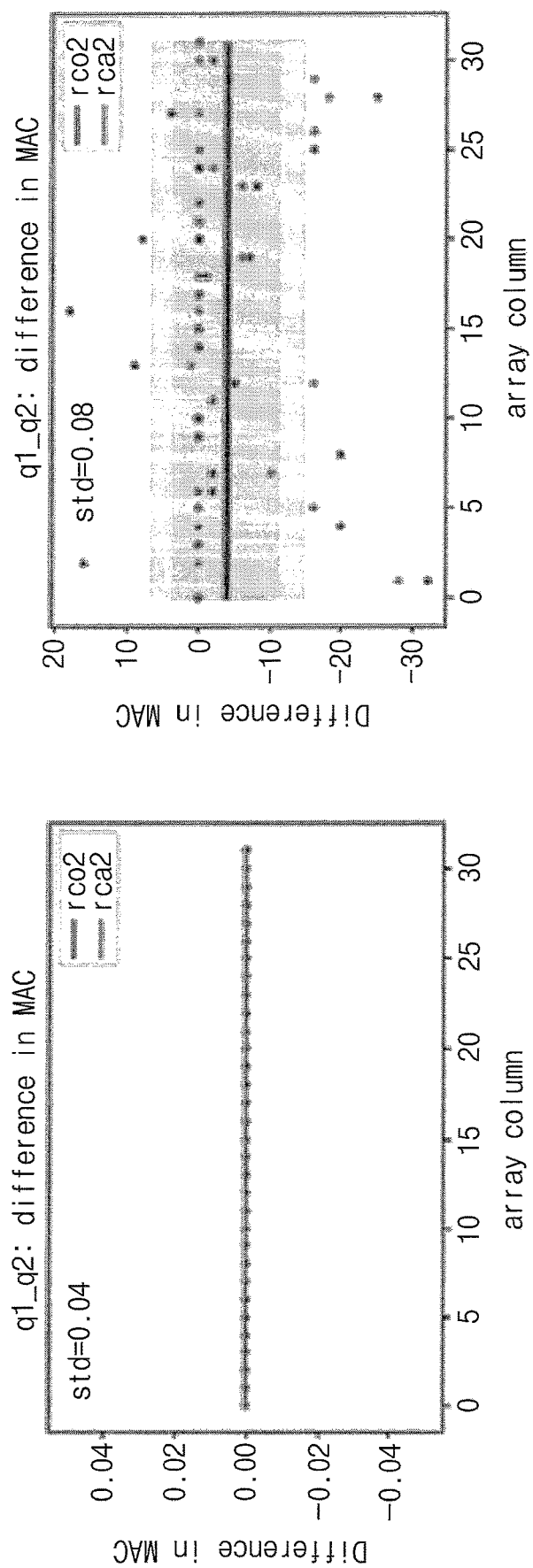

Referring to FIG. 16, when 1-sigma of standard deviation is about 4% (or 0.04) and about 8% (or 0.08), differences between analog-to-digital converted MAC values using the reference currents and ideal MAC values are illustrated for each array column. In FIG. 16, "rco2" represents a related art technique using offset resistors, and "rca2" represents the examples of FIGS. 11 and 13. In a case of "rca2", it can be seen that a range of ±1-sigma of the standard deviation of the analog-to-digital converted MAC values and the ideal MAC values is relatively narrow.

Figure 17A:
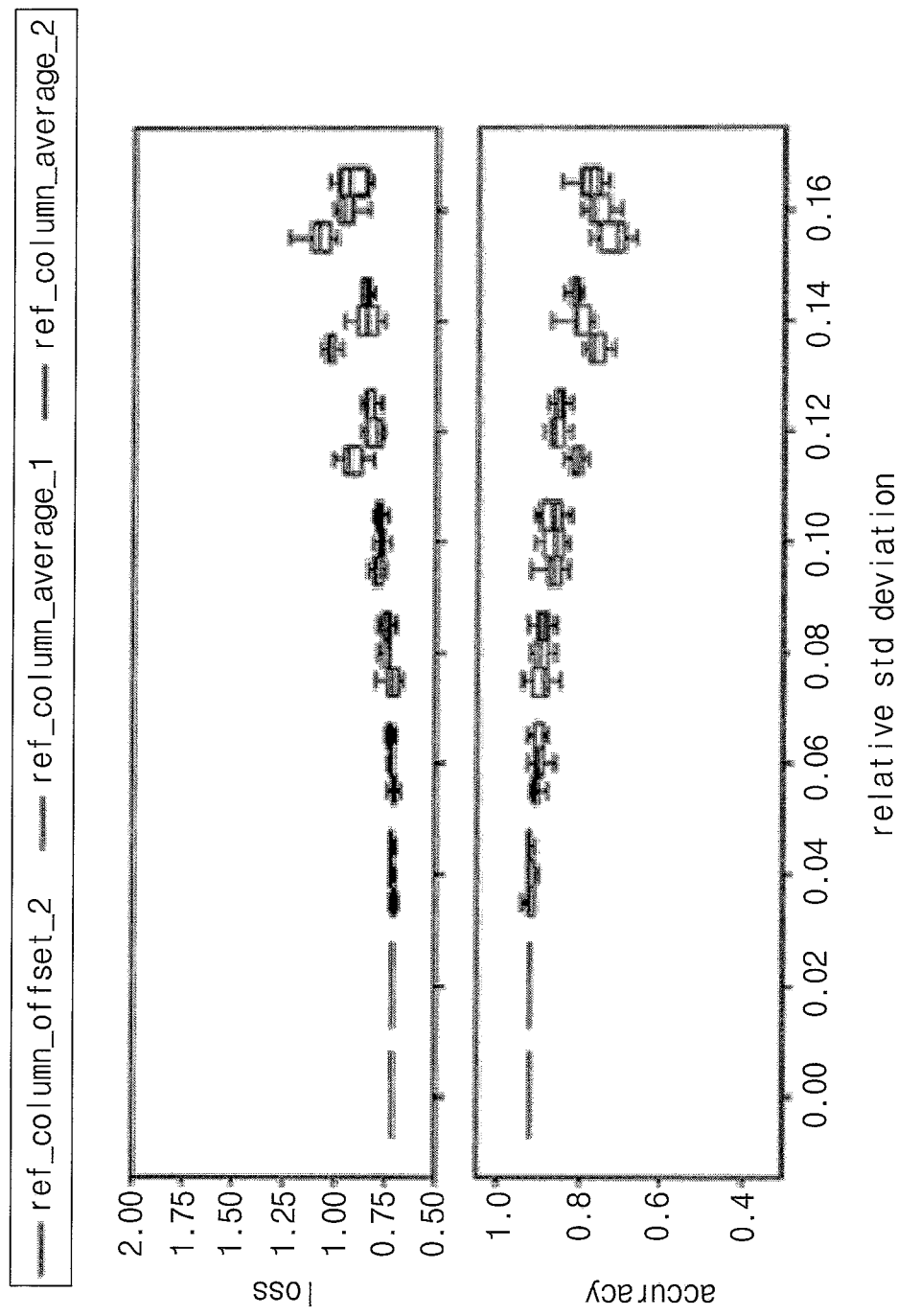
Figure 17B:
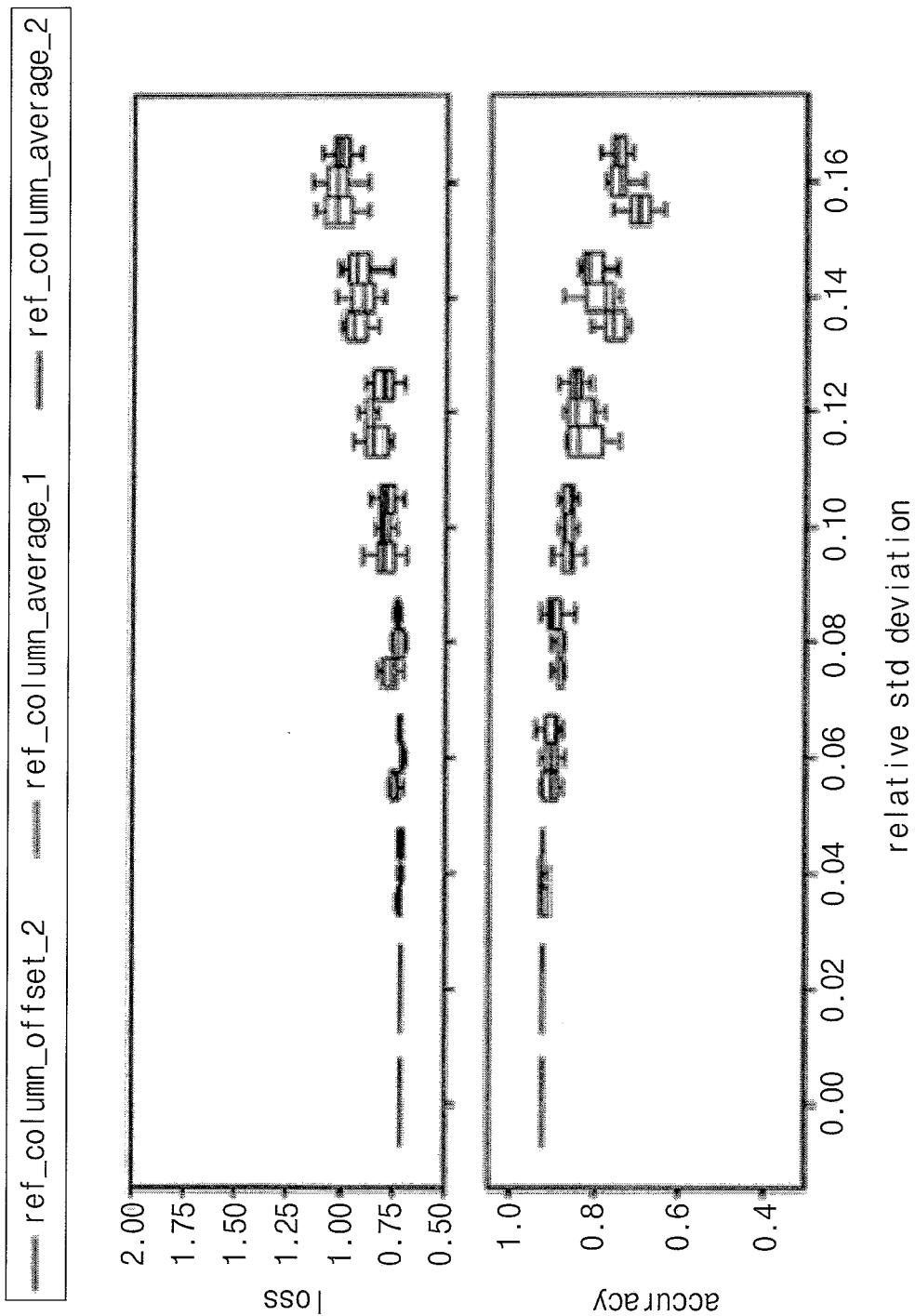
Figure 17C:
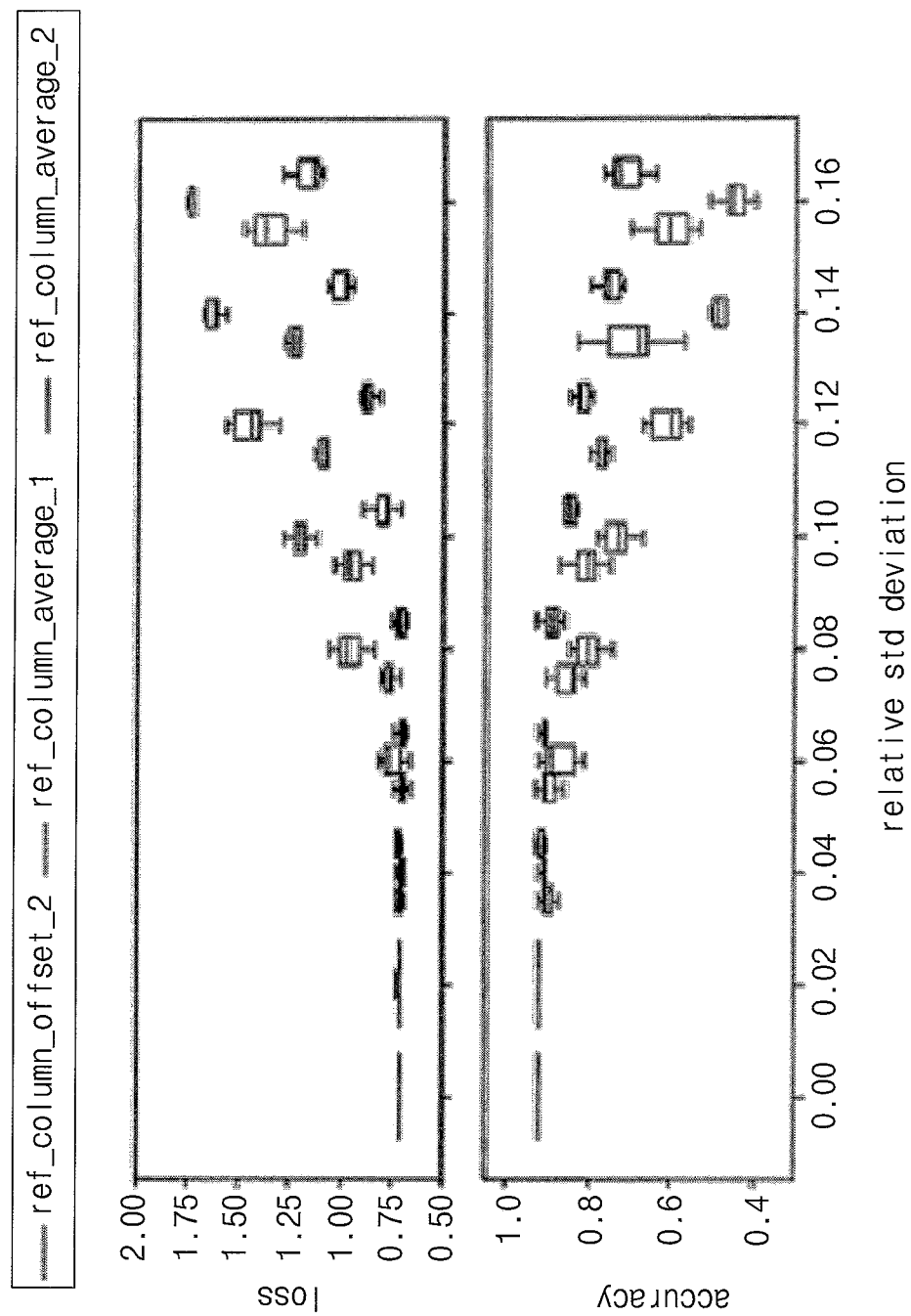
Figure 18A:
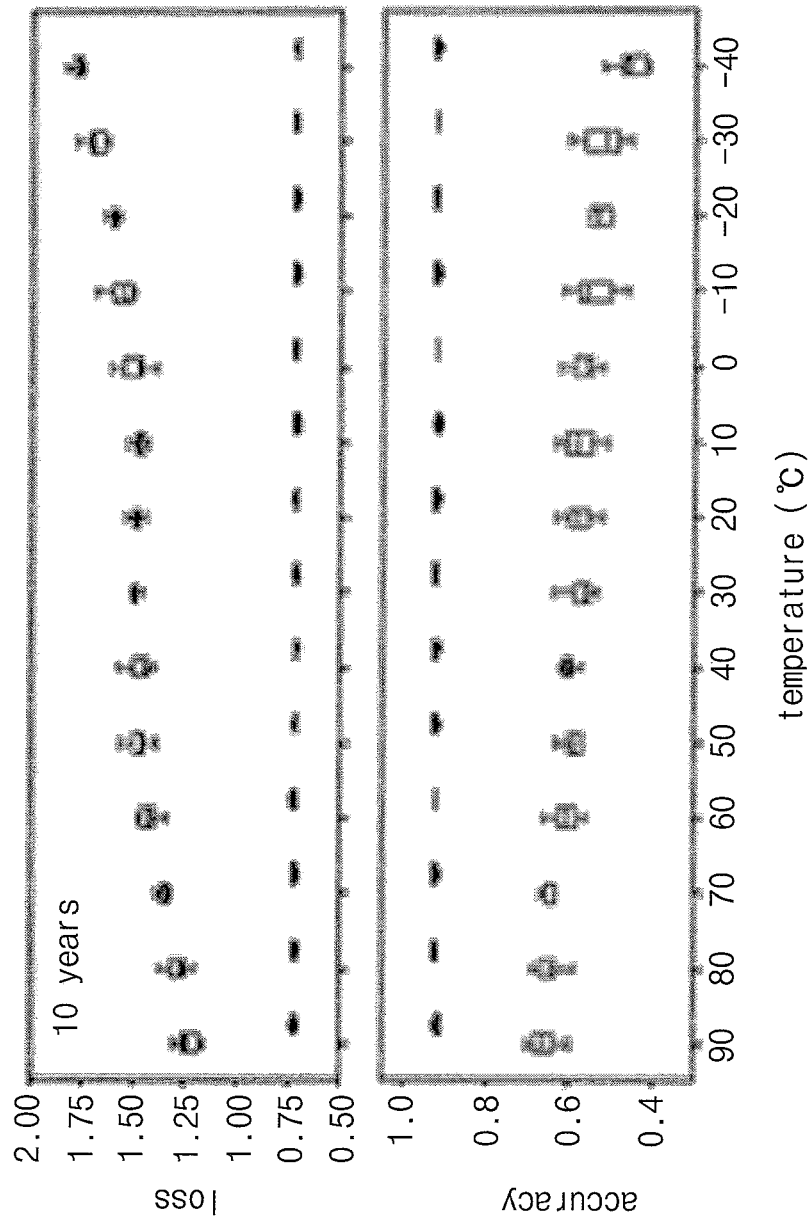
Figure 18B:
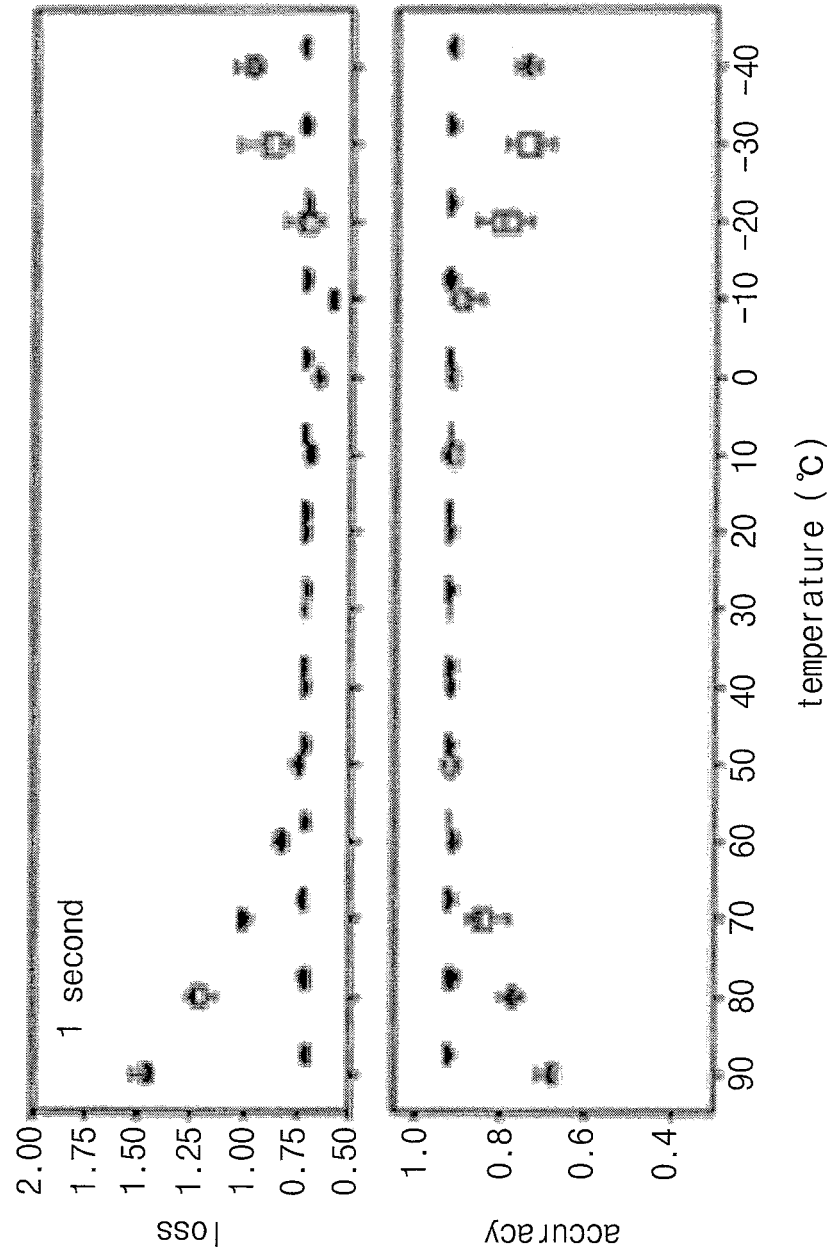
Figure 18C:
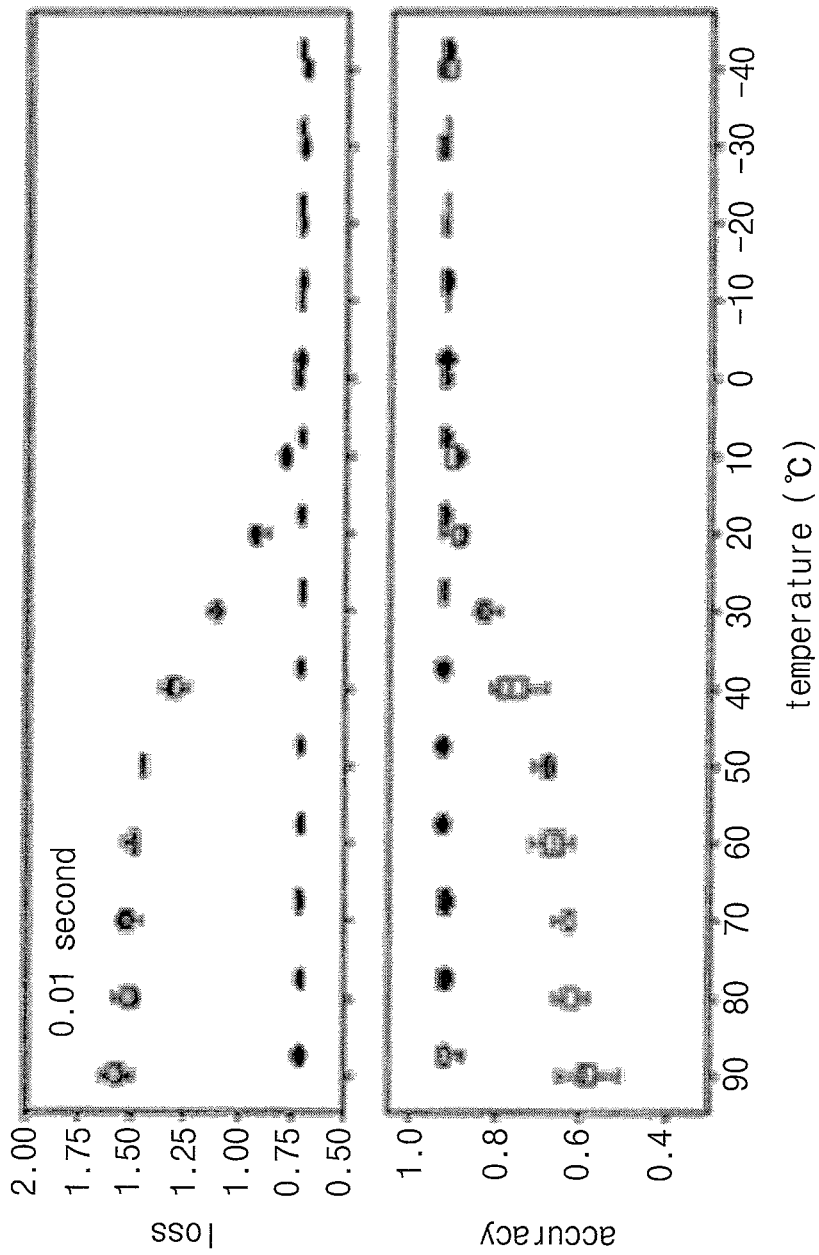
Figure 18D:
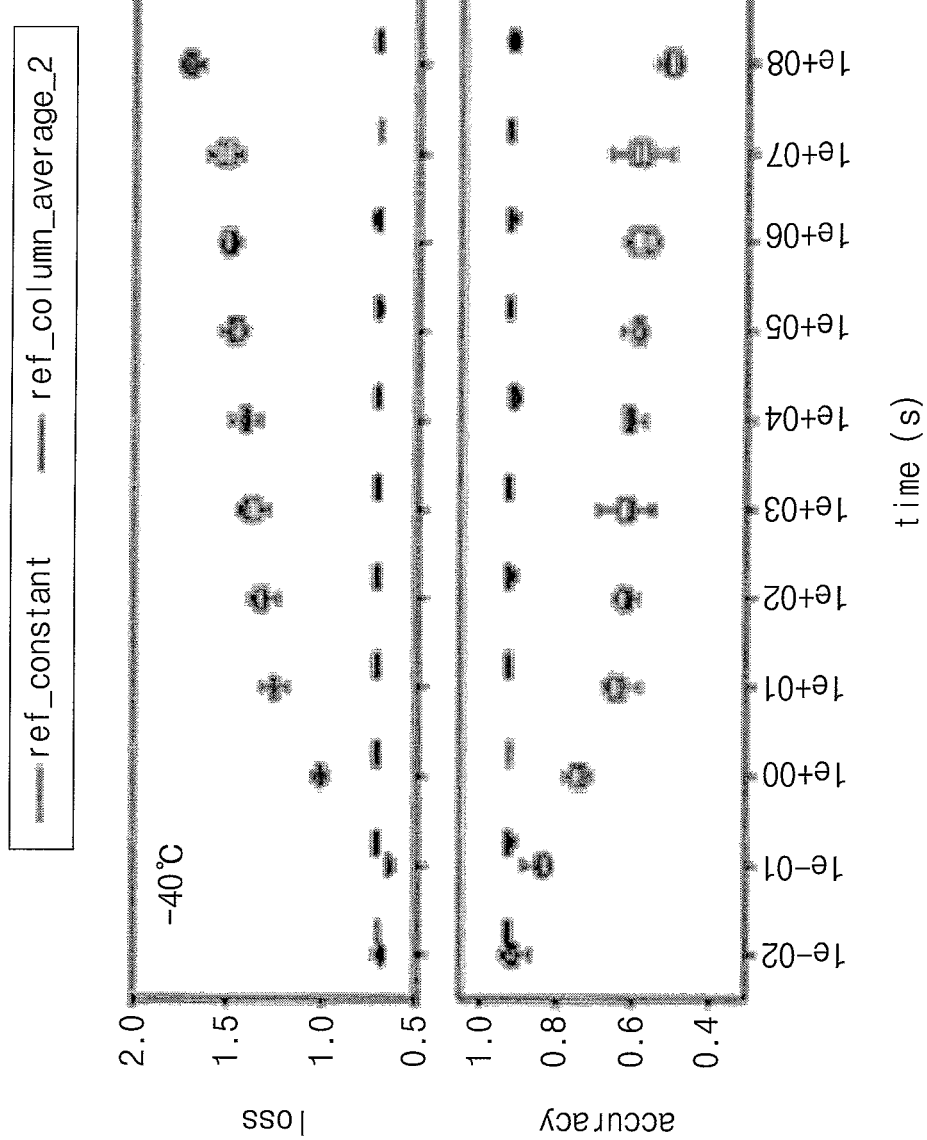
Figure 18E:
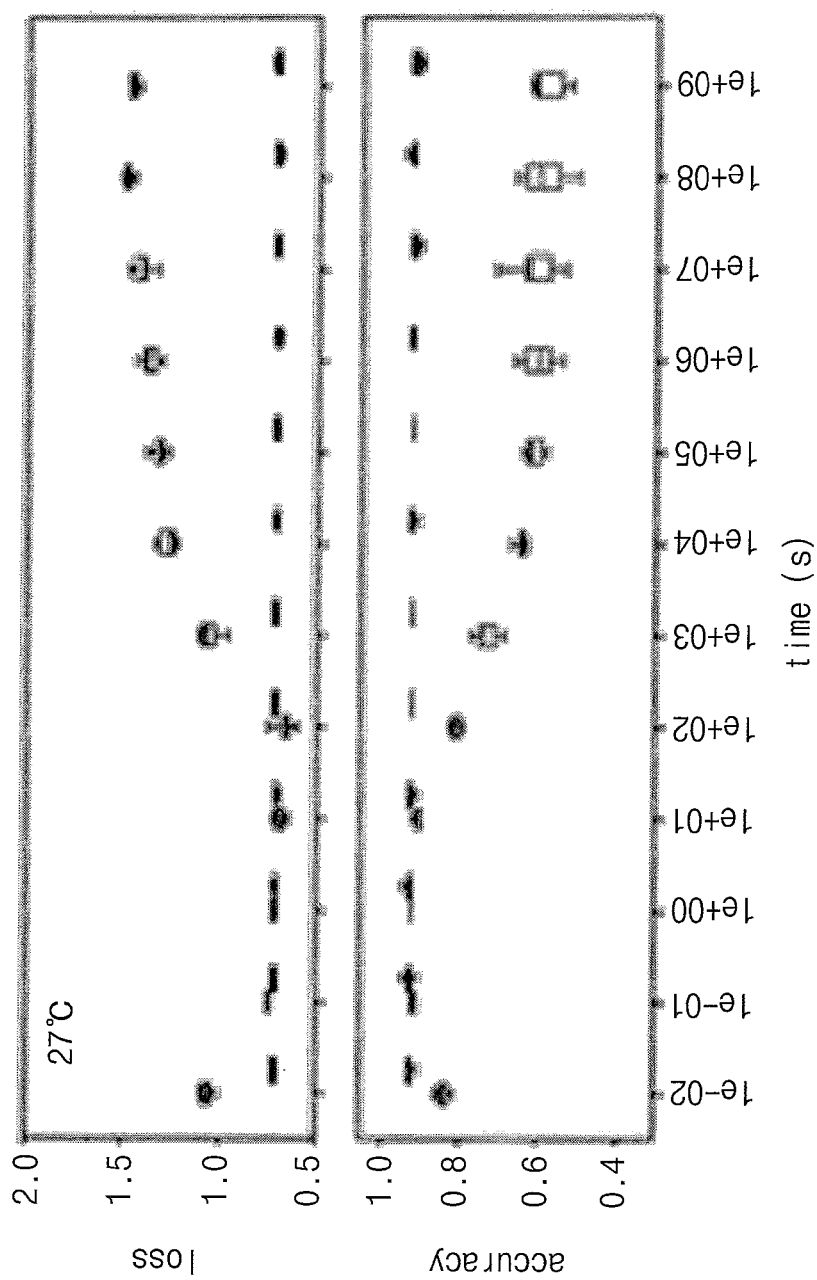
Figure 18F:
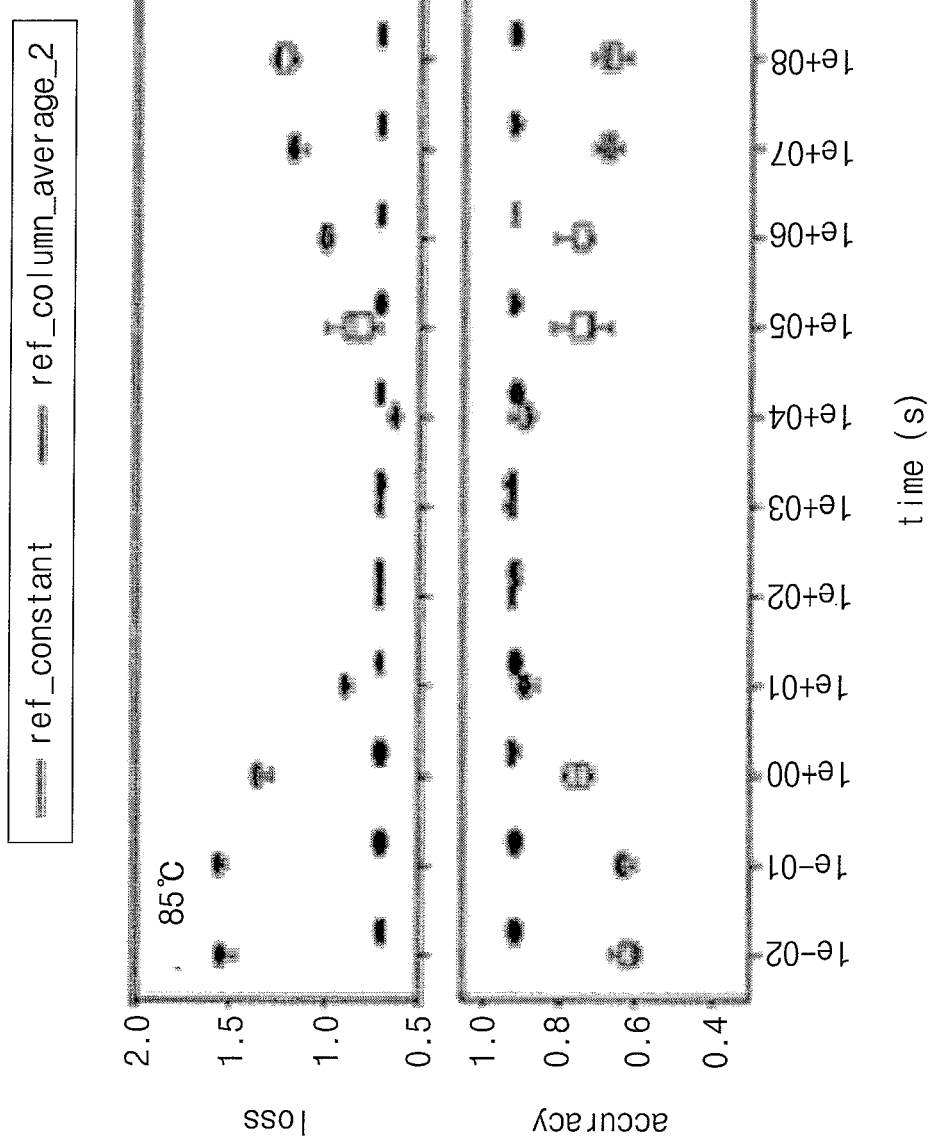

Referring to FIGS. 17A, 17B and 17C, the performance of the neuromorphic computing device 10 according to example embodiments in which the reference currents are generated by performing the averaging operation is illustrated. In FIGS. 17A, 17B and 17C, "ref_column_offset_2" represents a related art technique using offset resistors. Here, "reference_column_average 1" represents the examples of FIGS. 5 and 7, "reference_column_average 2" represents the examples of FIGS. 11 and 13, and the loss and accuracy are measured for each example. The measurement conditions (e.g., T=−40° C. in FIG. 17A) are provided in FIGS. 17A to 17C, and it can be seen that the performance is improved in an order of "reference_column_offset_2", "reference_column_average_1" and "reference_column_average_2".

Referring to FIGS. 18A, 18B, 18C, 18D, 18E and 18F, when 1-sigma of standard deviation is about 4%, it can be seen that the accuracy is improved at a given range of temperature (e.g., about −40° C. to 85° C.) and a given range of time (e.g., about 0.01 seconds to 315,360,000 seconds (=about 10 years)). In 18A, 18B, 18C, 18D, 18E and 18F, "ref_constant" represents a comparative example of a related art.

Figure 19A:
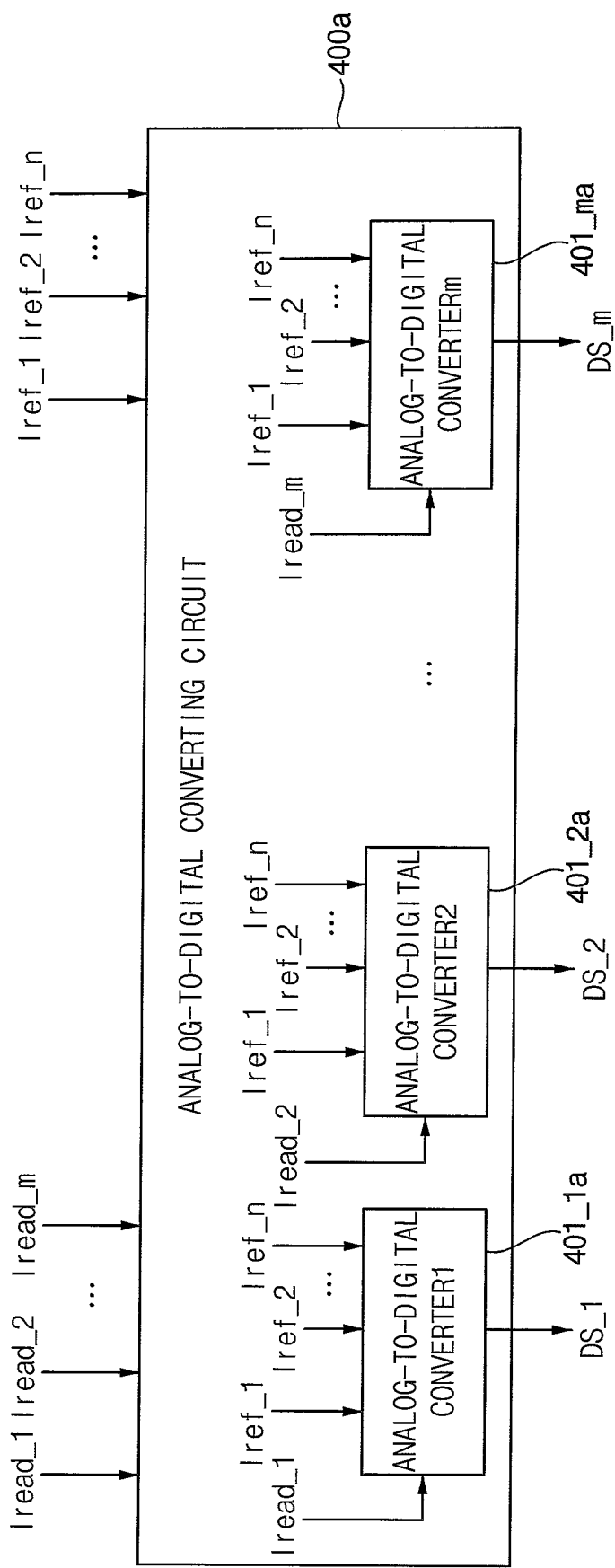
FIGS. 19A and 19B are block diagrams illustrating an analog-to-digital converting circuit included in a neuromorphic computing device according to example embodiments.
Figure 19B:
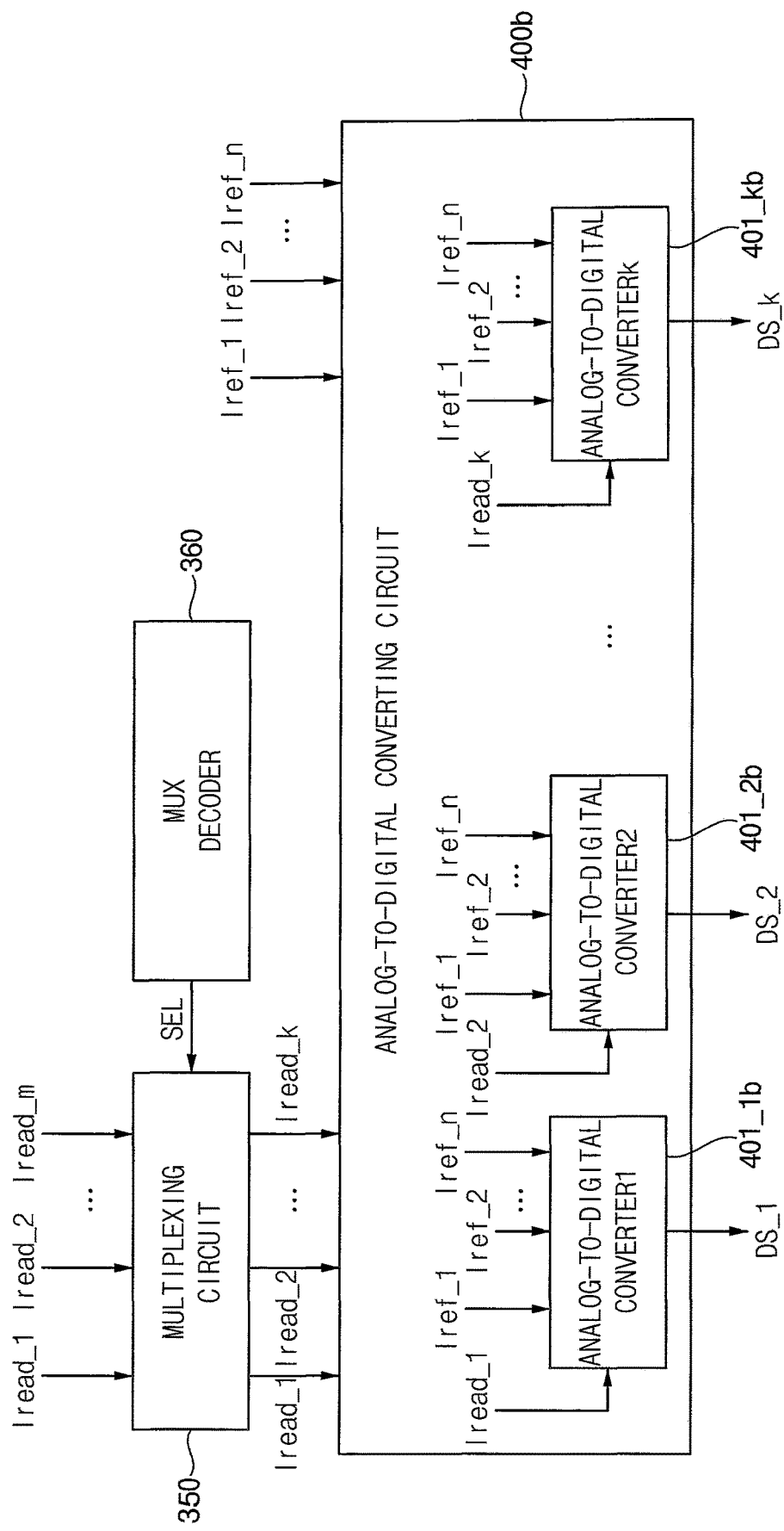

FIGS. 19A and 19B are block diagrams illustrating examples of an analog-to-digital converting circuit included in a neuromorphic computing device according to example embodiments.

Referring to FIG. 19A, an analog-to-digital converting circuit 400a may include a plurality of analog-to-digital converters 401_1a, 401_2a, . . . , 401_ma, where m is an integer greater than or equal to 1. In an example of FIG. 19A, the number of the plurality of analog-to-digital converters 401_1a to 401_ma may be equal to the number of the plurality of read currents Iread_1 to Iread_m. Each analog-to-digital converter may also be described as an analog-to-digital converter sub-circuit.

The first analog-to-digital converter 401_1a may convert the first read current Iread_1 into the first digital signal DS_1 based on the reference currents Iref_1 to Iref_n. Similarly, the second analog-to-digital converter 401_2a may convert the second read current Iread_2 into the second digital signal DS_2 based on the reference currents Iref_1 to Iref_n. The m-th analog-to-digital converter 401_ma may convert the m-th read current Iread_m into the m-th digital signal DS_m based on the reference currents Iref_1 to Iref_n.

Referring to FIG. 19B, an analog-to-digital converting circuit 400b may include a plurality of analog-to-digital converters 401_1b, 401_2b, . . . , 401_kb. A neuromorphic computing device including the analog-to-digital converting circuit 400b may further include a multiplexing circuit 350 and a MUX decoder 360 that are disposed between the first memory cell array 100 and the analog-to-digital converting circuit 400b. In an example of FIG. 19B, the number of the plurality of analog-to-digital converters 401_1b to 401_kb may be less than the number of the plurality of read currents Iread_1 to Iread_m (e.g., k is a natural number greater than or equal to two and less than m).

The multiplexing circuit 350 may select k read currents Iread_1 to Iread_k from among the m read currents Iread_1 to Iread_m based on a selection signal SEL, and provide the selected read currents to the analog-to-digital converting circuit 400b. The MUX decoder 360 may generate the selection signal SEL used for selecting the read currents, and may provide the selection signal SEL to the multiplexing circuit 350.

The first analog-to-digital converter 401_1b may convert the first read current Iread_1 into the first digital signal DS_1 based on the reference currents Iref_1 to Iref_n. Similarly, the second analog-to-digital converter 401_2b may convert the second read current Iread_2 into the second digital signal DS_2 based on the reference currents Iref_1 to Iref_n. The k-th analog-to-digital converter 401_kb may convert the k-th read current Iread_k into the k-th digital signal DS_k based on the reference currents Iref_1 to Iref_n.

Figure 20:
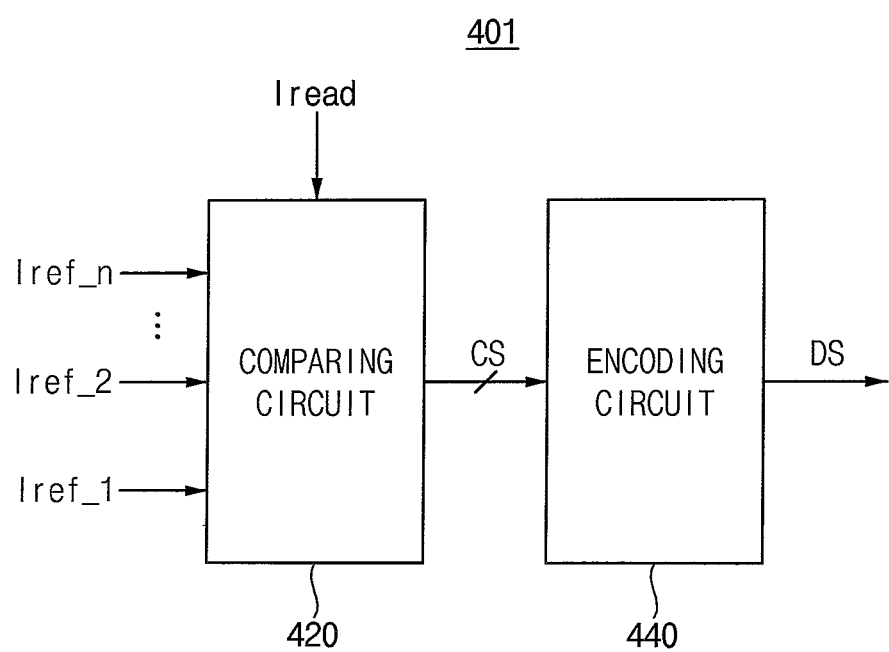
FIG. 20 is a block diagram illustrating an example of an analog-to-digital converter included in analog-to-digital converting circuits of FIGS. 19A and 19B.

FIG. 20 is a block diagram illustrating an example of an analog-to-digital converter included in analog-to-digital converting circuits of FIGS. 19A and 19B.

Referring to FIG. 20, an analog-to-digital converter 401 may include a comparing circuit 420 and an encoding circuit 440.

The analog-to-digital converter 401 may convert a corresponding read current Iread into a corresponding digital signal DS based on the reference currents Iref_1 to Iref_n, and may output the digital signal DS. The comparing circuit 420 may generate and output a plurality of comparison signals CS by comparing the read current Iread with the reference currents Iref_1 to Iref_n. For example, the comparing circuit 420 may include a plurality of comparators. The encoding circuit 440 may generate and output the digital signal DS corresponding to the read current Iread based on the plurality of comparison signals CS.

Figure 21:
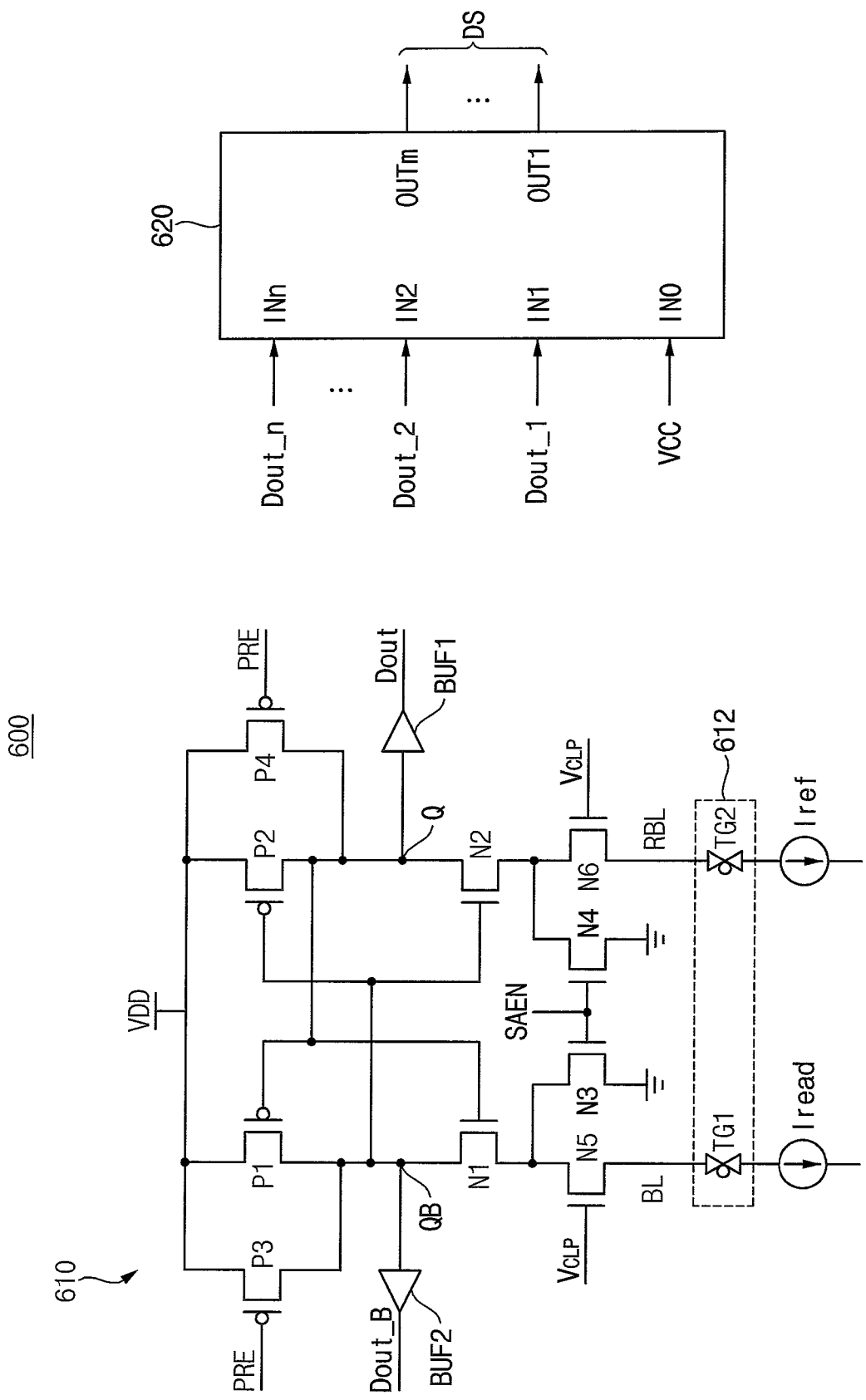
FIG. 21 is a diagram illustrating a sense amplifier circuit and an encoder included in a neuromorphic computing device according to example embodiments.

FIG. 21 is a diagram illustrating an example of a sense amplifier circuit and an encoder included in a neuromorphic computing device according to an example embodiment.

Referring to FIG. 21, a circuit 600 that includes a sense amplifier circuit 610 and an encoder 620 may correspond to a part of the analog-to-digital converting circuit 400.

The sense amplifier circuit 610 may include transistors P1, P2, P3, P4, N1, N2, N3, N4, N5 and N6, and buffers BUF1 and BUF2. The sense amplifier circuit 610 may be connected to a selecting circuit 612 including transfer gates TG1 and TG2. The sense amplifier circuit 610 may be connected to a corresponding bitline BL and a corresponding reference bitline RBL through the selecting circuit 612, and may receive a corresponding read current Iread and a corresponding reference current Iref through the selecting circuit 612. The sense amplifier circuit 610 may generate signals Dout and Dout_B corresponding to the read current Iread based on voltages and signals VDD, PRE, $V_{CLP}$ and SAEN and the reference current Iref.

The encoder 620 may include input terminals IN0, IN1, IN2, . . . , INn receiving the power supply voltage VCC and the signals Dout_1, Dout_2, . . . , Dout_n, and output terminals OUT1, . . . , OUTm outputting bits of the digital signal DS.

For example, when the first read current Iread_1 is received, the sense amplifier circuit 610 may provide the signal Dout that is generated based on the first read current Iread_1 and the first reference current Iref_1 as the signal Dout_1, and then may provide the signal Dout that is generated based on the first read current Iread_1 and the second reference current Iref_2 as the signal Dout_2, and then may provide the signal Dout that is generated based on the first read current Iread_1 and the n-th reference current Iref_n as the signal Dout_n. The encoder 620 may generate the first digital signal DS_1 corresponding to the first read current Iread_1 based on the signals Dout_1 to Dout_n.

In some example embodiments, the analog-to-digital converting circuit 400 may include a plurality of sense amplifier circuits 610. When the number of sense amplifier circuits included in the analog-to-digital converting circuit 400 increases, the analog-to-digital converting operation may be implemented in parallel.

Figure 22:
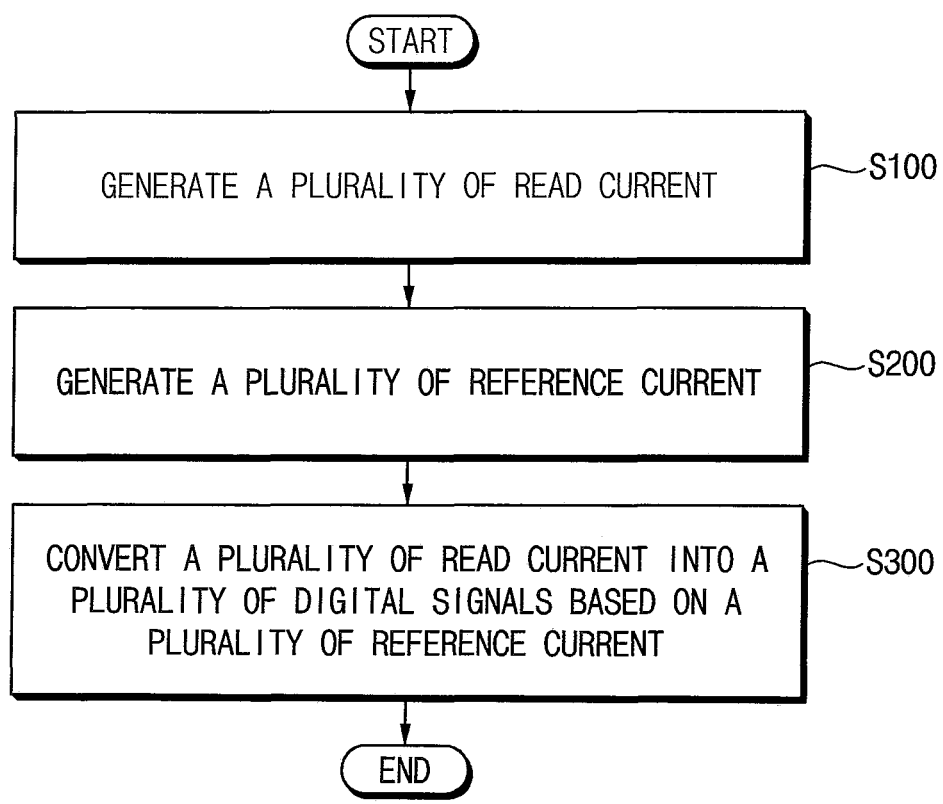
FIG. 22 is a flowchart illustrating a method of operating a neuromorphic computing device according to an example embodiment.

FIG. 22 is a flowchart illustrating a method of operating a neuromorphic computing device according to example embodiments.

Referring to FIGS. 1 and 22, in a method of operating the neuromorphic computing device 10 according to example embodiments, the first memory cell array 100 generates the plurality of read currents Iread_1 to Iread_m based on the plurality of input signals and the plurality of data (step S100). The second memory cell array 200 generates the plurality of reference currents Iref_1 to Iref_n (step S200). The analog-to-digital converting circuit 400 converts the plurality of read currents Iread_1 to Iread_m into the plurality of digital signals DS_1 to DS_m based on the plurality of reference currents Iref_1 to Iref_n (step S300). The neuromorphic computing device 10 may be implemented as described with reference to FIGS. 1 through 21.

Figure 23:
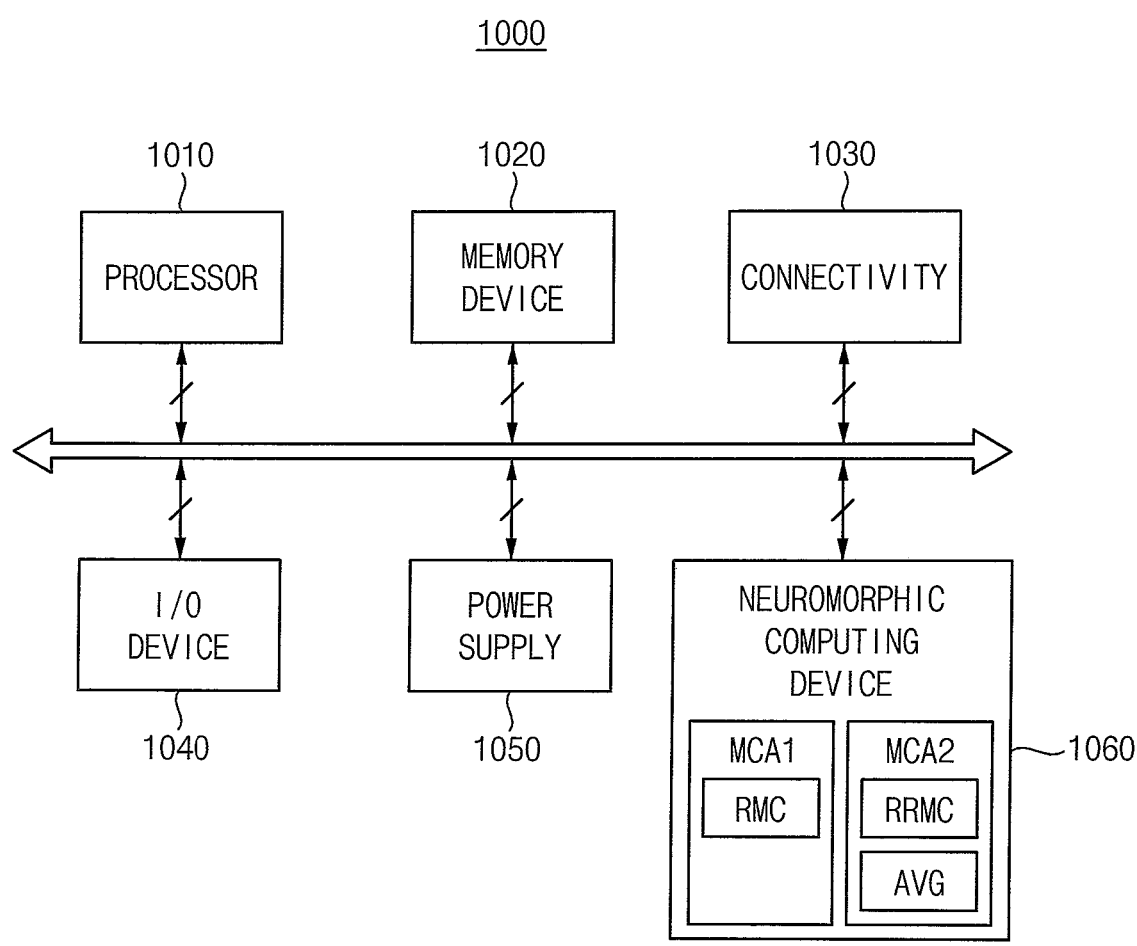
FIG. 23 is a block diagram illustrating an electronic system according to an example embodiment.

FIG. 23 is a block diagram illustrating an electronic system according to example embodiments.

Referring to FIG. 23, an electronic system 1000 may include a processor 1010, a memory device 1020, a connectivity 1030, an input/output (I/O) device 1040, a power supply 1050 and a neuromorphic computing device 1060.

The neuromorphic computing device 1060 may drive and/or execute a neural network system, and may be the neuromorphic computing device 10 according to example embodiments. The neuromorphic computing device 1060 may include a first memory cell array MCA1 including resistive memory cells RMC, and a second memory cell array MCA2 including reference resistive memory cells RRMC and an averaging circuit AVG.

The inventive concept may be applied to various electronic devices and systems that include the neuromorphic computing devices and/or the neural network systems. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing are example embodiments and should not to be construed as limiting the embodiments of the disclosure. Although some example embodiments have been described, those skilled in the art will readily appreciate that many modifications are possible in the example embodiments without materially departing from the inventive concept of the present disclosure. Accordingly, all such modifications are intended to be included within the scope of the example embodiments as defined in the claims. Therefore, it is to be understood that the foregoing example embodiments should not to be construed as being limited to the specific example embodiments, and that modifications to the disclosed example embodiments, as well as other embodiments, are intended to be included within the scope of the appended claims.

What is claimed is:

1. A neuromorphic computing device comprising:
a first memory cell array including a plurality of resistive memory cells that are connected to a plurality of wordlines, a plurality of bitlines and a plurality of source lines, and configured to store data and generate a plurality of read currents based on a plurality of input signals and the data;
a second memory cell array including a plurality of reference resistive memory cells that are connected to a plurality of reference wordlines, a plurality of reference bitlines and a plurality of reference source lines, and configured to generate a plurality of reference currents; and
an analog-to-digital converting circuit configured to convert the plurality of read currents into a plurality of digital signals based on the plurality of reference currents,
wherein,
the plurality of reference resistive memory cells are arranged in columns to form a plurality of reference columns, and the plurality of reference columns are configured to generate a plurality of column currents, and
one of the plurality of reference currents is generated by averaging at least two of the plurality of column currents.

2. The neuromorphic computing device of claim 1, wherein
the plurality of read currents include a first current level to an (n+1)-th current level, where n is a natural number greater than or equal to two, and
the plurality of reference columns include a first reference column to an (n+1)-th reference column configured to generate a first column current to an (n+1)-th column current having the first current level to the (n+1)-th current level, respectively.

3. The neuromorphic computing device of claim 2, wherein
the plurality of reference currents include a first reference current to an n-th reference current, and
one of the plurality of reference currents is generated by averaging two adjacent column currents among the first column current to the (n+1)-th column current.

4. The neuromorphic computing device of claim 3, wherein the first reference current to the n-th reference current are sequentially generated.

5. The neuromorphic computing device of claim 4, wherein,
the plurality of reference bitlines include a first bitline to an (n+1)-th bitline connected to the first reference column to the (n+1)-th reference column, respectively,
the plurality of reference source lines include a first source line to an (n+1)-th reference source line connected to the first reference column to the (n+1)-th reference column, respectively, and
the neuromorphic computing device further comprises:
a reference bitline driver configured to sequentially drive two adjacent reference bitlines among the first reference bitline to the (n+1)-th reference bitline; and
a reference source line driver configured to sequentially drive two adj acent reference source lines among the first reference source line to the (n+1)-th reference source line.

6. The neuromorphic computing device of claim 5, wherein,
the plurality of reference wordlines include a first reference wordline to an n-th reference wordline connected to the first reference column to the (n+1)-th reference column, respectively, and
a voltage having a first level is applied to the first reference wordline to the n-th reference wordline.

7. The neuromorphic computing device of claim 3, wherein a current level of an i-th reference current among the first reference current to the n-th reference current is between an i-th current level and an (i+1)-th current level among the first current level to the (n+1)-th current level, where i is a natural number greater than or equal to one and less than or equal to n.

8. The neuromorphic computing device of claim 1, wherein,
each of the plurality of read currents has a respective one of a first current level to a (n+1)-th current level, where n is a natural number greater than or equal to two, and
the plurality of reference columns include:
a first reference column to an n-th reference column configured to generate a first column current to an n-th column current having the first current level to the n-th current level among the first current level to the (n+1)-th current level; and
an (n+1)-th to a 2n-th reference column configured to generate an (n+1)-th column current to a 2n-th column current having a second current level to the (n+1)-th current level among the first current level to the (n+1)-th current level.

9. The neuromorphic computing device of claim 8, wherein,
the plurality of reference currents include the first reference current to the n-th reference current, and
one of the first reference current to the n-th reference current is generated by averaging one of the first column current to the n-th column current and one of the (n+1)-th column current to the 2n-th column current.

10. The neuromorphic computing device of claim 9, wherein the first reference current to the n-th reference current are simultaneously generated.

11. The neuromorphic computing device of claim 10, wherein,
the plurality of reference bitlines include a first reference bitline to an n-th reference bit line connected to the first reference column to the n-th reference column, respectively, and an (n+1)-th reference bitline to a 2n-th reference bitline connected to the (n+1)-th reference column to the 2n-th reference column, respectively,
the plurality of reference source lines include a first reference source line to an n-th reference source line connected to the first reference column to the n-th reference column, respectively, and an (n+1)-th reference source line to a 2n-th reference source line connected to the (n+1)-th reference column to the 2n-th reference column, respectively, and
the neuromorphic computing device further comprises:
a reference bitline driver configured to drive the first reference bitline to the 2n-th reference bitline; and
a reference source line driver configured to drive the first reference source line to the 2n-th reference source line.

12. The neuromorphic computing device of claim 9, wherein,
the plurality of reference wordlines include a first reference wordline to an n-th reference wordline connected to the first reference column to the n-th reference column and an (n+1)-th reference wordline to a (2n−1)-th reference wordline connected to the (n+1)-th reference column to the 2n-th reference column,
a first voltage having a first level is applied to the first reference wordline to the n-th reference wordline, and
a second voltage having a second level different from the first level is applied to the (n+1)-th reference wordline to the (2n−1)-th reference wordline.

13. The neuromorphic computing device of claim 12, wherein the first reference wordline to the n-th reference wordline are electrically separated from the (n+1)-th wordline to the (2n−1-)th reference wordline.

14. The neuromorphic computing device of claim 1, further comprising:
a wordline driver configured to drive the plurality of wordlines and the plurality of reference wordlines, and configured to drive the plurality of reference wordlines such that all of the plurality of reference wordlines are enabled during a computational operation of the neuromorphic computing device.

15. The neuromorphic computing device of claim 14, wherein a number of the plurality of reference currents is equal to a number of the plurality of wordlines.

16. The neuromorphic computing device of claim 14, wherein,
the data stored in the plurality of resistive memory cells correspond to a plurality of elements of a weight matrix used in the computational operation of the neuromorphic computing device, and
the wordline driver is configured to drive the plurality of wordlines such that at least one wordline among the plurality of wordlines is enabled based on element values of an input feature vector during the computational operation of the neuromorphic computing device.

17. The neuromorphic computing device of claim 1, wherein the plurality of reference resistive memory cells include a resistive material that is same as a resistive material included in the plurality of resistive memory cells.

18. The neuromorphic computing device of claim 1, further comprising:
an adder circuit configured to generate output data by performing accumulation and summation operations based on the plurality of digital signals.

19. A method of operating a neuromorphic computing device including a first memory cell array, a second memory cell array and an analog-to-digital converting circuit, the method comprising:
generating, by the first memory cell array, a plurality of read currents based on a plurality of input signals and data stored in the first memory cell array;
generating, by the second memory cell array, a plurality of reference currents; and
converting, by the analog-to-digital converting circuit, the plurality of read currents into a plurality of digital signals based on the plurality of reference currents, wherein,
the first memory cell array includes a plurality of resistive memory cells that are connected to a plurality of wordlines, a plurality of bitlines and a plurality of source lines, and is configured to store the data,
the second memory cell array includes a plurality of reference resistive memory cells that are connected to a plurality of reference wordlines, a plurality of reference bitlines and a plurality of reference source lines,
the plurality of reference resistive memory cells are arranged in columns to form a plurality of reference columns, and the plurality of reference columns are configured to generate a plurality of column currents, and
one of the plurality of reference currents is generated by averaging at least two of the plurality of column currents.

20. A neuromorphic computing device comprising:
a first memory cell array including a plurality of resistive memory cells that are connected to a first worldline to an n-th wordline, a first bitline to an m-th bitline and a first source line to an m-th source line, where each of n and m is a natural number greater than or equal to two;
a second memory cell array including a plurality of reference resistive memory cells that are connected to a plurality of reference wordlines, a plurality of reference bitlines and a plurality of reference source lines;
a wordline driver configured to drive the first wordline to the n-th wordline and the plurality of reference wordlines, enable at least one wordline among the first wordline to the n-th wordline based on element values of an input feature vector, and enable the plurality of reference wordlines;
an analog-to-digital converting circuit configured to convert a first read current to an m-th read current into a first digital signal to an m-th digital signal, respectively, based on a first reference current to an n-th reference current, the first read current to the m-th read current being output from the first memory cell array through the first bitline to the m-th bitline or the first source line to the m-th source line, the first reference current to the n-th reference current being output from the second memory cell array through the plurality of reference source lines; and
an adder circuit configured to generate output data by performing accumulation and summation operations based on the first digital signal to the m-th digital signal,
wherein,
each of the first read current to the m-th read current has a first current level to an (n+1)-th current level, respectively,
a current level of an i-th reference current among the first reference current to the n-th reference current is between an i-th current level and an (i+1)-th current level among the first current level to the (n+1)-th current level, where i is a natural number greater than or equal to one and less than or equal to n,
the plurality of reference resistive cells are arranged in columns to form a plurality of reference columns, and the plurality of reference columns are configured to generate a plurality of column currents, and
the i-th reference current is generated by averaging a column current having the i-th current level and a column current having the (i+1)-th current level among the plurality of column currents.

* * * * *